(12) United States Patent
Chakraborty et al.

(10) Patent No.: US 9,740,577 B1
(45) Date of Patent: Aug. 22, 2017

(54) BACKING UP A VIRTUAL MACHINE AND RESTORING FROM A SYNTHETIC FULL BACKUP

(71) Applicant: EMC IP Holding Company LLC, Hopkinton, MA (US)

(72) Inventors: Anupam Chakraborty, Bangalore (IN); Vladimir Mandic, San Jose, CA (US); Matthew D Buchman, Seattle, WA (US); Sunil Yadav, Bangalore (IN); Tushar Dethe, Bangalore (IN); Soumen Acharya, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 22 days.

(21) Appl. No.: 14/840,476

(22) Filed: Aug. 31, 2015

(51) Int. Cl.
*G06F 11/14* (2006.01)
*G06F 9/455* (2006.01)

(52) U.S. Cl.
CPC ...... *G06F 11/1469* (2013.01); *G06F 9/45558* (2013.01); *G06F 11/1451* (2013.01); *G06F 11/1464* (2013.01); *G06F 2009/45583* (2013.01); *G06F 2201/815* (2013.01); *G06F 2201/84* (2013.01)

(58) Field of Classification Search
CPC ............. G06F 11/1469; G06F 11/1451; G06F 11/1464
See application file for complete search history.

(56) References Cited

U.S. PATENT DOCUMENTS

| | | | | |
|---|---|---|---|---|
| 8,819,369 B1* | 8/2014 | Alappat | ............ | G06F 17/30088 707/640 |
| 9,424,136 B1* | 8/2016 | Teater | ..................... | G06F 3/065 |
| 2006/0259587 A1* | 11/2006 | Ackerman | ......... | G06Q 20/3678 709/219 |
| 2012/0117342 A1* | 5/2012 | Karonde | ............. | G06F 11/1451 711/162 |
| 2014/0095816 A1* | 4/2014 | Hsu | ........................ | G06F 3/0655 711/162 |
| 2014/0317059 A1* | 10/2014 | Lad | ..................... | G06F 11/1458 707/649 |

\* cited by examiner

*Primary Examiner* — Yolanda L Wilson
(74) *Attorney, Agent, or Firm* — Staniford Tomita LLP

(57) ABSTRACT

A backup agent issues to a virtual machine management service (VMMS) a request to export a virtual machine (VM). The VMMS generates a configuration file associated with the export that cannot be accessed by the backup agent because the file is encrypted. A full backup of the exported VM is performed. A first backup check point corresponding to the full backup is created. After the full backup, a second backup check point is created. The agent issues to the VMMS a request to export changes to the VM between the first and second backup check points. An incremental backup of the exported changes is performed and a backup components document is created. A synthetic full backup based on the incremental and full backups is created and restoration of the VM from the synthetic full backup is based on the information in the backup components document.

15 Claims, 12 Drawing Sheets

| VM GUID | Last Backup | Backup Type | Reference point sequence ID | Backup Location |
|---|---|---|---|---|
| VM 1 | Oct. 9, 2014, 3:15 AM | Full | T1 | BackupMediaA/vmbackups/full |
| VM 1 | Oct 10, 2015, 7:00 AM | Incremental | T2 | BackupMediaA/vmbackups/incremental |
| ... | ... | ... | ... | ... |

BACKING UP A VIRTUAL MACHINE AND RESTORING FROM A SYNTHETIC FULL BACKUP

TECHNICAL FIELD

Embodiments are generally directed to networked-based data backup methods, and more specifically to backing up and restoring a virtual machine.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

In today's digital society organizations depend on having ready access to their data. Data, however, can be lost in a variety of ways such as through accidental deletion, data corruption, disasters and catastrophes (e.g., fires or flooding), media failures (e.g., disk crash), computer viruses, and so forth. Thus, it is important to backup data in the event that the data needs to be restored. An organization may have an immense amount of data that is critical to the organization's operation. Backing up data and subsequently recovering backed up data, however, can involve large amounts of computing resources such as network bandwidth, processing cycles, and storage due to the complexity and amount of data to be backed up and restored when needed.

Virtual machines have emerged as one of the fundamental technologies that companies use in their data centers and elsewhere to manage data and provide services. A host hardware platform uses virtualization software to create and host any number of virtual machines. A virtual machine is a software abstraction of a real computer system. A host hardware platform may host dozens, hundreds, or even thousands of virtual machines.

There is an ever increasing demand for backup and recovery techniques that improve the backup and recovery performance of virtual machines. A typical computing environment hosting a virtual machine may include software applications from any number of different vendors. For example, the vendor providing the virtualization platform may be different from the vendor providing the backup application. Information needed by the backup application to efficiently backup and restore virtual machines hosted by the virtualization platform may not be readily available. For example, in some cases, the virtualization platform will fail to provide access to configuration information associated with a virtual machine that the backup application may need to efficiently backup and restore the virtual machine.

Therefore, there is a need for improved backup and recovery techniques, and especially a technique that enables a backup application and system to interact with a virtualization platform to efficiently backup and recover a virtual machine.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 7B shows an example of a table for managing virtual machine check points according to a specific embodiment.

DETAILED DESCRIPTION

Figure 1:
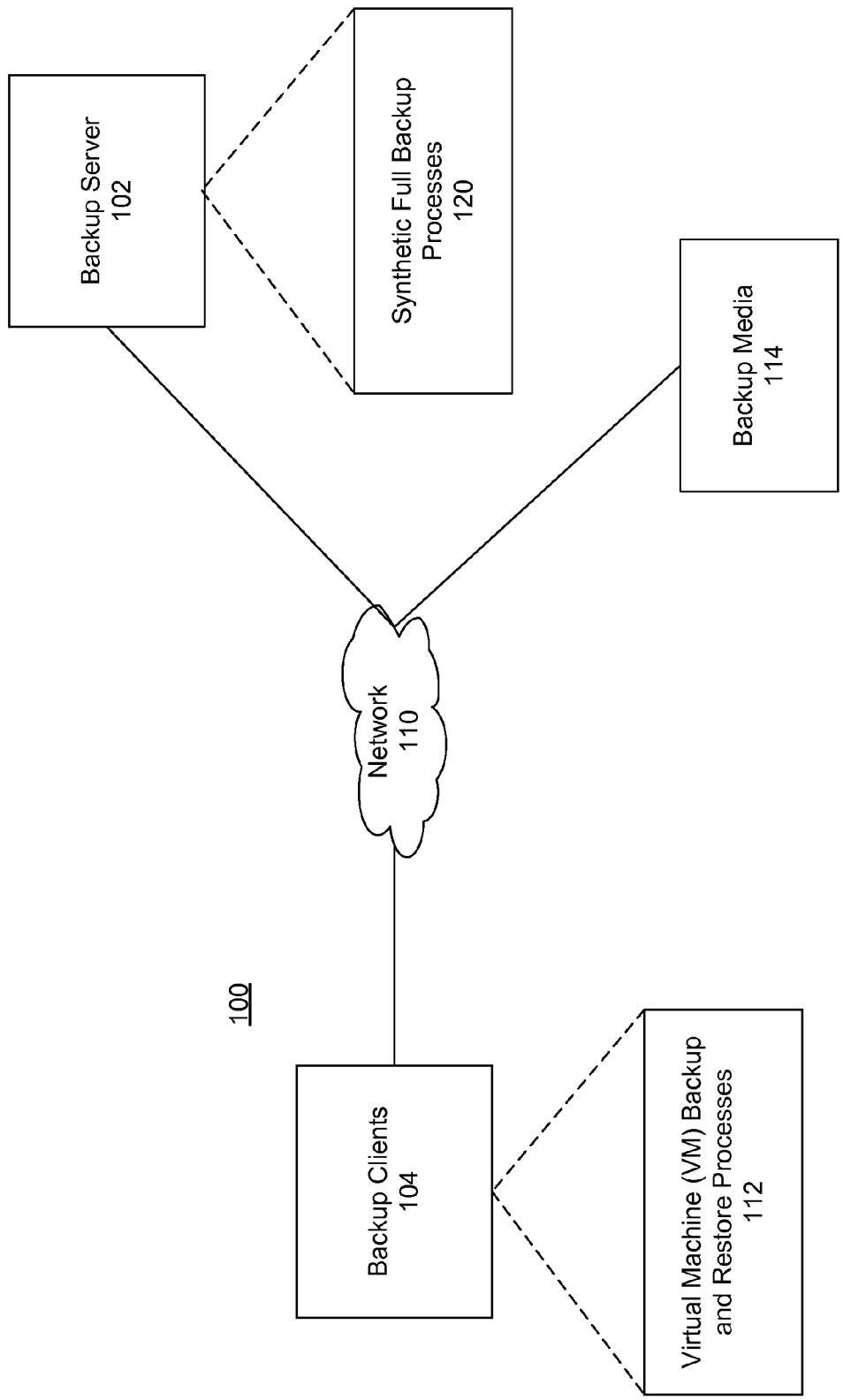
FIG. 1 is a diagram of a large-scale network implementing a data backup and recovery process that provides for backing up and recovering a virtual machine, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for backing up and restoring virtual machines that can be used as part of a disaster recovery solution for large-scale networks.

Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a system for backing up and restoring virtual machines. In system 100, a number of clients 104 are provided to serve as backup clients or nodes. A network or backup server computer 102 is coupled directly or indirectly to these clients through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated within system 100 may be stored in a backup media 114. The backup media may be located at any number of persistent storage locations and devices, such as local client storage, server storage, or network storage, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology.

For the embodiment of FIG. 1, network system 100 includes backup server 102, one or more backup clients 104, and backup media 114. A backup client executes processes 112 for backing up and restoring a virtual machine hosted by the backup client. The backup server executes processes 120 for synthesizing a full backup of a virtual machine.

In an embodiment, system 100 may represent a Data Domain Restorer (DDR)-based deduplication storage system, and a storage server having backup media 114 may be implemented as a DDR Deduplication Storage server provided by EMC Corporation. However, other similar backup and storage systems are also possible. System 100 may utilize certain protocol-specific namespaces that are the external interface to applications and include NFS (network file system) and CIFS (common internet file system) namespaces, as well as a virtual tape library (VTL) or DD Boost provided by EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files.

Figure 2:
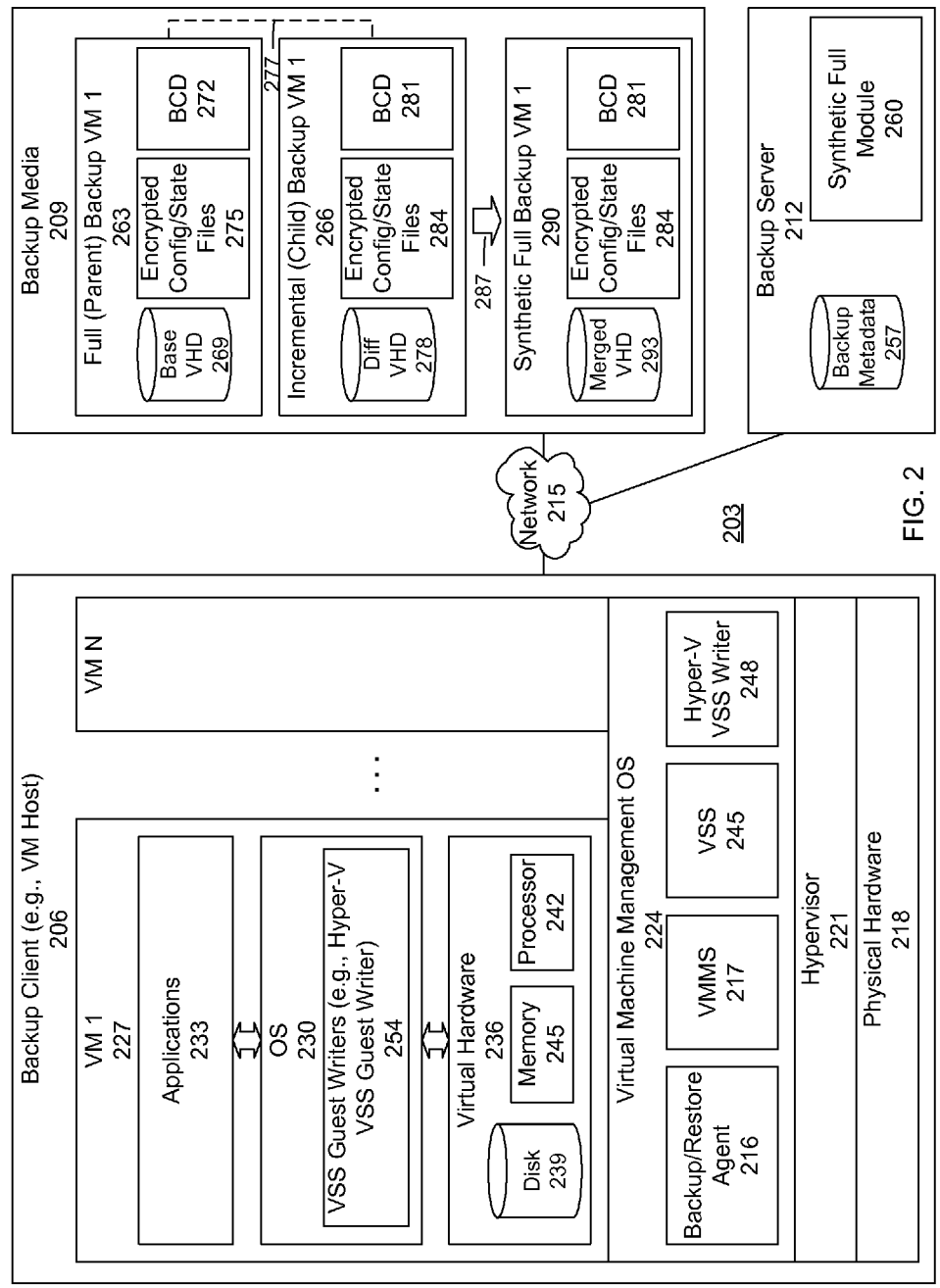
FIG. 2 shows an overall architecture of a system for backup and recovery according to a specific embodiment.

FIG. 2 shows further detail of a system 203 for backing up and restoring virtual machines hosted by a backup client 206. The backup client may be referred to as a host, host computer, host server, host machine, or production host. The system shown in FIG. 2 includes the backup client, backup media 209, and a backup server 212, each of which are interconnected by a network 215.

The backup client hosts any number of virtual machines (e.g., VM 1 . . . VM N). A backup/restore agent 216 installed at the client provides for the backup of a particular virtual machine hosted on the client to the backup media. Metadata associated with the backup such as the time and date of the backup, device in which backup is stored (e.g., location of the backup media) and so forth may be indexed and stored at the backup server. If, for example, the virtual machine on the host is inadvertently deleted, removed, or corrupted, the backup agent can restore the backed up virtual machine stored on the backup media to the host. In a specific embodiment, the virtual machine is restored to the same host upon which the virtual machine was backed up from. In another specific embodiment, the virtual machine may be restored to a host different from the host that the virtual machine was backed up from.

The backup agent interacts with virtualization software on the host computer to backup and restore virtual machines provided by the virtualization software. In a specific embodiment, the backup agent communicates with a service referred to as the Microsoft Virtual Machine Management (VMMS) service 217 to backup (and restore) the desired virtual machine. The backup agent directs, instructs, or controls the operation of VMMS to backup and restore a virtual machine as desired.

In this specific embodiment, backing up a virtual machine includes issuing a request to VMMS to export the virtual machine. Requesting an export of a virtual machine allows the backup agent to backup a particular virtual machine rather than backing up the entire volume or physical client. For example, in some cases a physical machine may host dozens, hundreds, or even thousands of virtual machines. A backup administrator, however, may wish to backup a particular virtual machine rather than the entire physical machine. Backing up all the virtual machines when only a single or less than all the virtual machines is desired is an inefficient use of time and computing resources (e.g., processing cycles, storage, network bandwidth, and so forth). Further, if the backup fails the entire backup process may have to be restarted. For example, in prior approaches if a backup failed for a particular virtual machine the failure would affect the backup of other virtual machines.

As part of the export process, VMMS creates files that include a configuration and state of the exported virtual machine. VMMS encrypts these files. Because the configuration and state files are encrypted, the backup agent is unable to access these files. Not being able to access these encrypted configuration and state files can be problematic for restoring a virtual machine from a synthetic full backup of the virtual machine because the backup system will not be able to access these encrypted files to determine how the restored virtual machine from the synthetic full backup should be configured. A synthetic full backup is a type of backup that is created artificially on the backup media by, for example, the backup server. In a synthetic full backup, a previous full backup (or parent backup) of a virtual machine is merged with one or more incremental backups (or child backups) of changes to the virtual machine.

Synthesizing full backups from incremental backups helps to increase recovery time objectives (RTO). For example, over time there may be an increasing number of incremental backups stored on the backup media. These incremental backups are dependent on previous backups and cannot be recovered separately or without the previous backup copy. The number of incremental backups is inversely proportional to recovery performance. Thus, as the number of incremental backups increases the restore performance decreases. Further, managing many separate incremental backups in the media (e.g., managing retention periods and expiration times and dates) can be very cumbersome.

As discussed above, reliance by the backup agent on the configuration and state files created by VMMS to restore a virtual machine to the host from a synthetic full backup is problematic because the backup agent cannot access or read these files as these files are encrypted by VMMS as part of the virtual machine export operation.

In a specific embodiment, a technique of the backup system, however, provides for creating a backup components document (BCD) that stores configuration and state information for configuring a virtual machine during a restore. The backup components document may be referred to as a pseudo BCD or a synthesized BCD. In a specific embodiment, this BCD is created by the backup agent or backup system. The backup agent stores in the BCD configuration and state information for a virtual machine backed up by the backup agent using the VMMS export operation. The BCD can be accessed, consulted, reviewed, read, or updated by the backup agent or backup system. The BCD allows the backup agent or system to restore the virtual machine from a synthetic full backup. In particular, the information stored in the BCD allows the virtual machine to be properly restored to the host according to the configuration and state information stored in the BCD. In a specific embodiment, the BCD file may be stored in an unencrypted format. In another specific embodiment, the BCD file may be stored in an encrypted format where the backup agent is able to access a key to decrypt the BCD file. The BCD file may be formatted as an extensible markup language (XML) file or any other file format as desired.

In a specific embodiment, the backup agent includes a backup logic that automatically falls back to a lower level of backup consistency when a higher level of backup consistency cannot be achieved. In a specific embodiment, the backup logic first seeks to create an application-consistent backup. If the application-consistent backup fails, the backup logic falls back to a file system-consistent backup. If both the application-consistent and file system-consistent backups fail, the backup logic falls back to a crash-consistent backup.

The backup client or VM host can be a general purpose computer with software and hardware. For example, physical hardware 218 may include a processor, storage, input/output (I/O) controller, network interface, and memory each of which may be interconnected by a bus architecture or any interconnection scheme. The backup client hosts any number of virtual machines (e.g., VM 1 . . . VM N). For example, there can be a single virtual machine or multiple virtual machines (e.g., two or more virtual machines). The host uses virtualization software to run the virtual machines or virtual devices. Generally, virtualization is an abstraction layer that allows multiple virtual environments to run in isolation, side-by-side on the same physical machine. A virtual machine (VM) is a software implementation of a machine (e.g., a computer) that executes programs like a physical machine. In other words, the virtual machine is a software abstraction of a physical computer system that is installed as a "guest" on a "host" hardware platform.

In a specific embodiment, the virtualization software includes a hypervisor 221 and a virtual machine management operating system (OS) 224. In this specific embodiment, the virtualization software or platform includes Hyper-V from Microsoft Corporation of Redmond, Wash. It should be appreciated that while some embodiments are shown and described in conjunction with Hyper-V and VMMS, aspects and principles of the system can be applicable to other virtualization platforms and services.

In this specific embodiment, the hypervisor is a thin layer of software between the hardware and virtual machines. The hypervisor is responsible for ensuring partition isolation and managing memory. The virtual machine management OS may be located in a specialized partition referred to as the parent partition and may include the virtualization stack and hardware specific device drivers. Virtual machines VM 1 . . . VM N are in guest partitions and go through the parent partition for their device access.

In other words, a virtual machine environment may utilize a hypervisor (e.g., Hyper-V) to create and run the virtual machines. A computer running the hypervisor is a host machine and all virtual machines are guest machines running guest operating systems (OS). The hypervisor provides the guest operating systems with a virtual operating platform and manages the execution of the VMs. In an embodiment, the backup agent is configured to operate with the Hyper-V hypervisor, which is a native hypervisor that creates VMs on Intel x86-64 based systems and is an integral part of the Microsoft Windows server products. In general, Hyper-V implements isolation of virtual machines in terms of a partition, which is a logical unit of isolation, supported by the hypervisor, in which each guest operating system executes. A hypervisor instance has to have at least one parent partition. The virtualization stack runs in the parent partition and has direct access to the hardware devices. The parent partition then creates the child partitions which host the guest OSs. A parent partition creates child partitions using an API.

More particularly, a virtual machine to be backed up by the backup agent, such as a virtual machine 227, can include a guest operating system 230, guest applications 233 running on the guest operating system, and virtual hardware 236 which represents a hardware state of the virtual machine. Virtual hardware refers to the hardware resources allocated to the virtual machine and is mapped to the hardware platform. The virtual hardware may include a virtual disk 239, virtual processor 242, virtual system memory 245, and various virtual devices for which the guest OS, virtual machine management OS, or both includes corresponding drivers. Virtual devices may include, for example, a virtual graphics adapter, a virtual network adapter, a virtual input/output (I/O) device, or the like. Each virtual machine may be assigned an identifier such as an Internet Protocol (IP) address, globally unique identifier (GUID), or both.

Backup/restore agent 216 may be installed at the backup client such as within virtual machine management OS 224. The virtual machine management OS may include virtual machine management service (VMMS) 217 and a copy service 245. VMMS provides services for managing the hosted virtual machines. These services include exporting and importing a virtual machine. In a specific embodiment, the backup agent uses the export and import services to backup and restore a virtual machine. In a specific embodiment, copy service 245 is referred to as a volume shadow copy service (VSS) as provided by Microsoft.

In general, VSS is an operating system (e.g., Microsoft Windows) resident service that allows the system to make snapshots of computer files or volumes even when they are in use. It is used in conjunction with a file system (e.g., NTFS) that is able to create and store shadow copies of files or volumes. A snapshot backup is a read-only copy of a volume at a particular point in time. Snapshots allow for the creation of consistent backups of a volume and ensure that contents do not change and are not locked while the backup is in progress. Snapshots are typically the first step in any incremental or full backup session, and the VSS service initiates and manages the snapshot creation process.

VSS uses a collection of VSS writers, such as a Hyper-V VSS writer 248, and guest VSS writers 254 in the virtual machine to facilitate the backup of various VSS-compatible applications and operating system components of the virtual machine. Each VSS-compatible application may have a corresponding writer. For example, there may be an Exchange Writer, SQL Server Writer, Hyper-V Writer, and so forth. A writer is responsible for functions such as quiescing the corresponding application and data stores to be backed up (e.g., temporarily freezing application I/O write requests).

Generally, when a backup is initiated VSS informs the VSS writer for each application of the virtual machine of the backup. This allows the application to flush memory-resident data to disk for the backup. In a conventional backup approach, the backup application reads a snapshot created by VSS in response to a backup request to VSS. Specifically, VSS performs a copy-on-write (COW) operation on the volume and allows a backup application to read and backup the snapshot data. A problem with this approach, however, is that the volume may include many virtual machines and the backup administrator may desire to backup just a single virtual machine or less than all the virtual machines. Thus, taking and backing up a VSS snapshot of the whole volume can be very inefficient. Furthermore, it has been observed that using VSS snapshots for backups often fail in large scale environments having hundreds or thousands of virtual machines. A VSS snapshot image of all the virtual machines on a volume or host can overwhelm the VSS service. An export-based backup as described herein, however, allows for backing up the virtual machines separately (e.g., individual backups and recovery of a particular virtual machine).

Virtual machine backups by the backup agent are stored on backup media 209. The backed up data may include a volume, portion of a volume, applications, services, user-generated or user data, logs, files, directories, databases, operating system information, configuration files, machine data, system data, and so forth.

Backup metadata 257 associated with the virtual machine backups, such as the time and date of the backup and location of the backup media, and so forth may be indexed, cataloged, or stored on backup server 212. The backup server may further include a code module or engine 260 for generating a synthetic full backup of a virtual machine.

For example, the backup media may include a full backup 263 of virtual machine 227 made at a first time and an incremental backup 266 of the virtual machine made at a second time, after the first time. The full backup may be referred to as a parent backup or saveset. The full backup may include a base virtual hard disk 269 of the virtual machine, a backup components document (BCD) 272 created by the backup agent during the export, and encrypted configuration and state files 275 created by VMMS during the export of the virtual machine.

After the backup agent performs the full backup of the virtual machine, the backup agent may perform an incremental backup of the virtual machine. An incremental backup captures changes in the virtual machine since the last backup. Incremental backup 266 may be referred to as a child backup or saveset and is linked 277 to the parent. The incremental backup may include a differential virtual hard disk 278 that includes the changes in the virtual machine between the first and second times, a BCD 281 created by the backup agent during the incremental export, and encrypted configuration and state files 284 created by VMMS during the export of changes to the virtual machine between the first and second times.

The synthetic full generator may then merge 287 the parent and incremental backups of the virtual machine to create a synthetic full backup 290 of the virtual machine. The synthetic full backup may be stored on the backup media. The synthetic full backup may include a merged virtual hard disk 293 and a BCD (or a copy of a BCD) from the last backup used in the synthetic full. In the example of FIG. 2, the BCD associated with the synthetic full backup is BCD 281 from the last incremental and it stores the configuration and state of the virtual machine as of this last backup. The merged virtual hard disk is formed by merging base virtual hard disk 269 and differential virtual hard disk 278 (or by merging copies of the base and differential disks).

The synthetic full backup may further include encrypted configuration and state files (or a copy of the encrypted files) from the last backup used in the synthetic full. In the example of FIG. 2, the encrypted configuration and state files associated with the synthetic full backup are the encrypted configuration and state files 284 (or copies of the encrypted files) from the last incremental. The encrypted configuration and state files are backed up without change. During restore the encrypted configuration and state files corresponding to the last backup associated with the synthetic full are first copied to the backup client (e.g., Hyper-V server) from the backup media. BCD 281 associated with the synthetic full backup may be used to identify the merged virtual hard disk, the encrypted configuration and state files as of the last backup included with the synthetic full, and may specify the folder paths or locations on the host where the merged virtual hard disk and encrypted configuration and state files should be copied to.

As will be described in further detail below, in a specific embodiment, a planned virtual machine is created on the backup client. The configuration of the planned virtual machine is modified using a PowerShell command. After the configuration of the planned virtual machine has been modified, the planned virtual machine is registered with VMMS.

In a specific embodiment, backup/restore agent 216 represents the NetWorker Module for Microsoft Applications (NMM) from EMC Corporation of Hopkinton, Mass. and the virtualization platform is Hyper-V from Microsoft. In this specific embodiment, the virtual hard disks are files formatted in the VHD or VHDX file format as provided by Microsoft. The VHD/VHDx format is a container format, which can contain disk related information. VHD/VHDx files can be mounted and used as a regular disk. Volumes such as NTFS/ReFS/FAT32 or any file system which the OS supports on the mounted disk can also be created.

A virtual hard disk may include, for example, a file system including files and folders. In this specific embodiment, a backup architecture provides a virtual machine backup method using export of a virtual machine and restore using import of a virtual machine. Incremental backups are implemented using reference points that track changes in a virtual machine from the point of backup. The new export method for backup takes the level of desired consistency (e.g., application-consistent, file system-consistent, and crash-consistent). As discussed, VMMS encrypts the virtual machine configuration file, e.g., "configuration.xml." The encryption prevents the backup application (e.g., NMM) from directly reading and modifying virtual machine configuration for performing a synthetic full restore of a virtual machine.

More specifically, the scalability aspect of the Hyper-V cluster has created a challenge on backup performance. It is desirable that backups be completed quickly to maintain the restore point objective (RPO) even though the Hyper-V Cluster may have been scaled out from a hundred to a thousand or more machines. Incremental backup is desirable for accelerating the backup speed. An incremental backup tracks the data changed from a last backup and can send only data that has changed over the IP network to the backup storage. Incremental backups are desirable because they reduce the backup time, help to reduce network congestion, and conserve storage space.

Incremental backups, however, can increase the restore time objective (RTO). Specifically, during a restore a backup administrator may need to restore a full backup and then may need to apply a number of incremental backups to restore to the desired point-in time. The RTO is improved, however, by synthesizing full virtual machine backups in the backend. The synthesize process recreates a full virtual machine from its incremental backup and last full or synthetic-full backup (e.g., merging parent and child backups stored on the backup media, remote from the production host).

Windows 2015 Hyper-V introduced reference points for incremental backups. In a specific embodiment, during each backup NMM creates a reference point. NMM exports the change of a virtual machine from the last reference point using the export method. The changes of a virtual machine from the last check point includes complete virtual machine configuration files and an AVHD (differencing VHD) of virtual hard disks.

The new export method takes the level of consistency required for the backup. A number of applications run inside a virtual machine. In a specific embodiment, NMM first initiates an application-consistent backup. In this case the VSS writer inside the virtual machine freezes (and thaws) the application running inside the virtual machine. If the VSS writer inside the virtual machine is not stable or there is no space inside the virtual hard disk (e.g., VHD) of a virtual machine, the application-consistent backup fails. NMM then initiates a file system-consistent backup of the virtual machine. If that fails, NMM initiates crash-consistent backup. Thus, the backup agent (e.g., NMM) seeks to backup a virtual machine using the highest level of consistency and can report the consistency level to the backup administrator.

The export method, however, does not create a Backup Component Document (BCD). Rather, the BCD is created by the backup agent or backup system. This BCD includes, among other things, information regarding the path of the virtual machine during backup. This information is required during the import method to restore the virtual machine to its original location on the host. The backup agent (e.g., NMM) creates the BCD from the Hyper-V VSS writer metadata. For example, the backup agent may retrieve the Hyper-V VSS writer metadata from a folder used by the Hyper-V VSS writer to store the metadata. Instead or additionally, the backup agent may query the Hyper-V VSS writer for the metadata.

A synthetic full backup may include collapsing the auto recovery snapshot and any user-created snapshots into a synthesized virtual hard disk (e.g., VHD) on the backup media. As a result, the backup system tracks the collapsing and adjusts the virtual hard disk descriptions to remove any chaining information for the auto recovery snapshot and user-created snapshots that were removed as part of the virtual synthetic. Since the virtual machine configuration and state files are encrypted in Hyper-V 2015, the backup system makes configuration changes during a restore using the BCD created by the backup system with a planned virtual machine representing the virtual machine to be restored.

In a specific embodiment, a backup architecture includes 1) backing up and restoring a virtual machine by using the virtual machine export and import methods of VMMS; 2) taking incremental backups using backup reference points; 3) retrying different levels of backup consistency to achieve reliable backups; 4) creating a BCD (or pseudo BCD) for backup using Hyper-V VSS Writer metadata to be used by import during restore; and 5) performing a synthetic full restore through the creation of a planned VM as the "configuration.xml" file is encrypted.

In this specific embodiment of the backup architecture, a backup level is decided based on the reference point of the last backup present in the backup media. The export method is used to backup a virtual machine instead of a VSS snapshot as a VSS backup of a large number of virtual machines can result in scalability issues. The export method calls the VSS writer inside the VM for an application-consistent backup. If the VSS writer inside the VM is not stable, the application-consistent backup is not successful. The backup agent (e.g., NMM) falls back to a file-system consistent backup. This fallback helps to ensure a reliable backup.

In other words, previous approaches for a Hyper-V backup involved using the VSS framework two phases. In a first phase, the VSS framework of the Hyper-V server was used to take snapshot of the volume (e.g., C: or D:) where the virtual machine was present. In a second phase, the VSS framework inside virtual machine froze the applications running inside virtual machine. In contrast, a new technique involves the backup agent using the export method in the Hyper-V server to backup a virtual machine. For an application consistent backup of the virtual machine, a VSS writer is involved to, for example, freeze or thaw the application running inside the virtual machine. If the VSS framework inside the virtual machine is not stable, the backup agent falls back to a file-system consistent backup inside the virtual machine which does not require VSS. When the backup agent (e.g., NMM) issues a request to VMMS to export a virtual machine, VMMS in turn calls the VSS writers inside the virtual machine to freeze the corresponding applications. That is, by default the export method takes an application consistent backup by calling the VSS writer inside the virtual machine. Below is an example of an export call:

Export-VM(<VM_Name>, <Consistency_Level);

The default consistency level is application-consistent. Other consistency levels include filesystem-consistent and crash-consistent During each backup, the backup agent creates a reference point. The backup agent exports the changes of a VM from the last reference point using the export method. The changes of a VM from the last check point includes complete virtual machine configuration files and an AVHD (differencing VHD) of the virtual hard disks. As discussed, the export method does not create a Backup Component Document (BCD). Rather, the backup agent or backup system creates a BCD for backup using Hyper-V VSS Writer metadata to be used by import during a restore. In a specific embodiment, a restore architecture of the backup system includes 1) initiating the import (ImportSystemDefinition method) which results in a planned virtual system; 2) removing the planned snapshots; 3) modifying the disk path; 4) validating the planned system; and 5) realizing the planned system.

Figure 3:
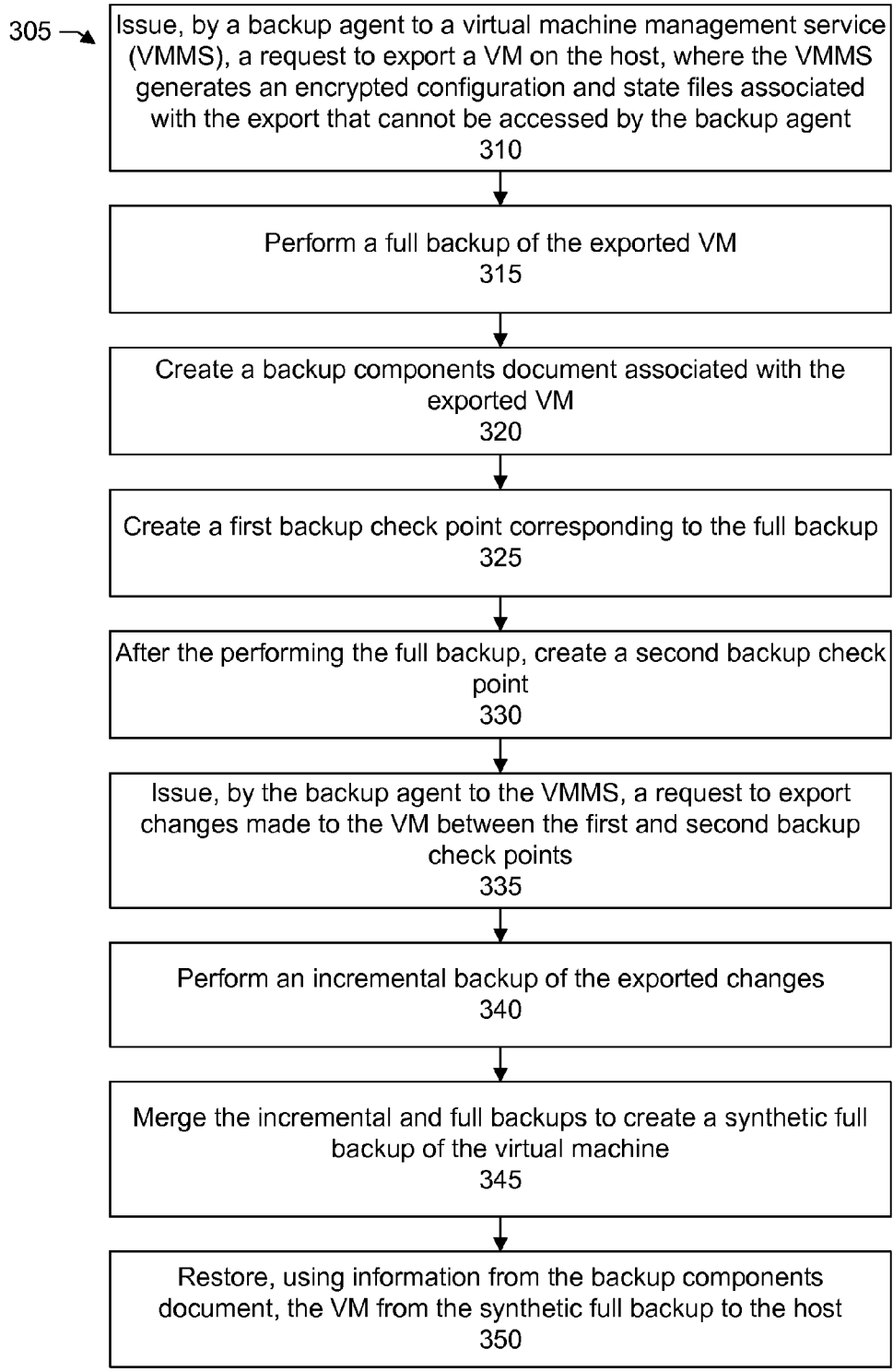
FIG. 3 shows an overall flow for backing up and restoring a virtual machine according to a specific embodiment.

FIG. 3 shows an overall flow 305 of the system shown in FIG. 2. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In brief, in a step 310, a backup agent on a host issues to a virtual machine management service (VMMS) a request to export a virtual machine on the host. In a step 315, the backup agent performs a full backup of the exported virtual machine. As discussed above, VMMS generates configuration and state files associated with the export that cannot be accessed by the backup agent because the configuration and state files are encrypted. That is, the content of the files is encoded or scrambled by VMMS. The backup agent does not have access to the encryption key or password that allows the files to be decrypted (e.g., translated into plain text) and read or modified. In a step 320, the backup agent creates a backup components document associated with the exported virtual machine. In a step 325, a first backup check point is created corresponding to the full backup.

Figure 4:
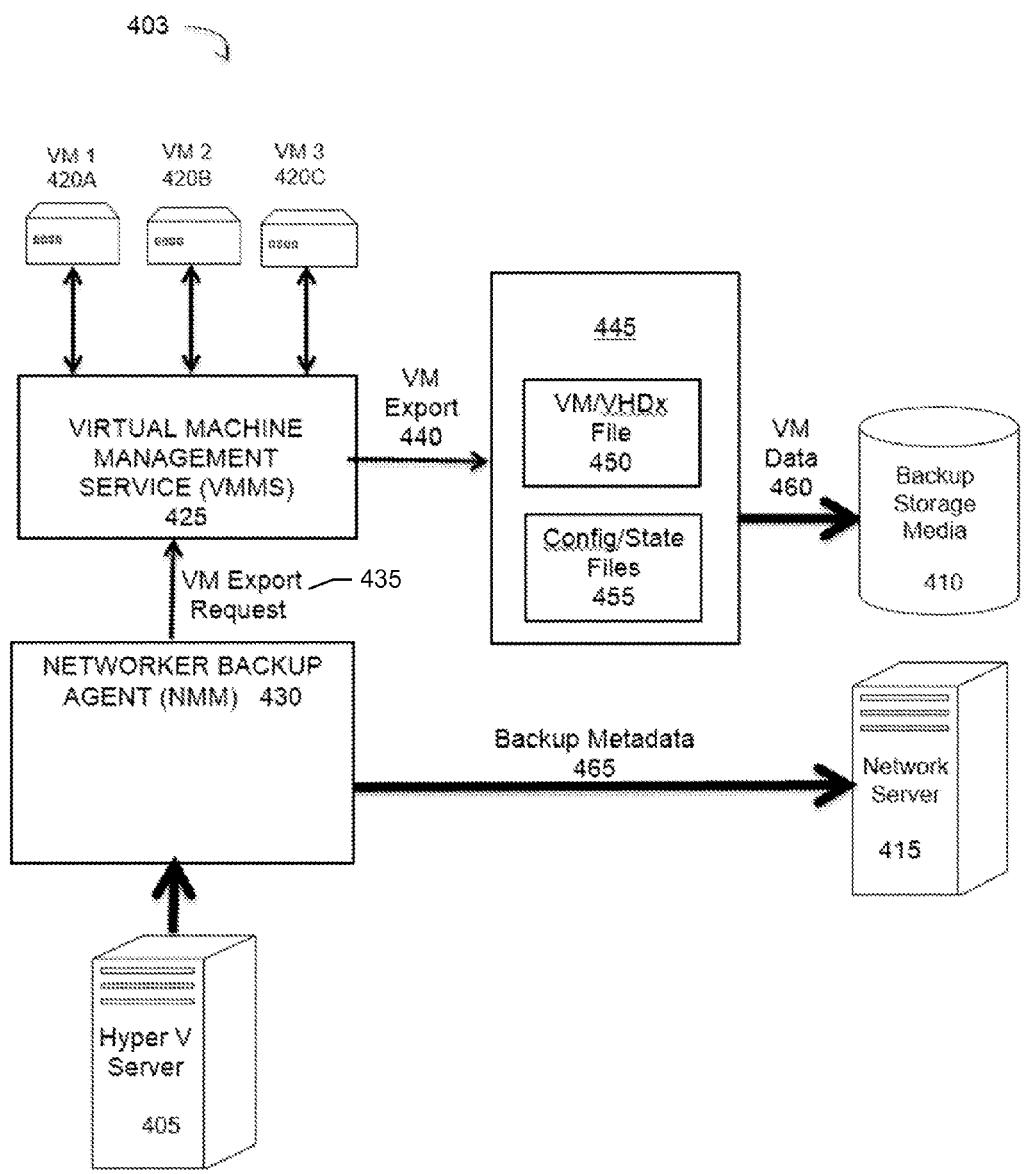
FIG. 4 shows a block diagram for an export-based backup of a virtual machine according to a specific embodiment.

FIG. 4 is a block diagram showing an example of a backup process 403. As shown in the example of FIG. 4, there is a server 405 (or backup client), a backup media 410, and a backup server 415. The server hosts any number of virtual machines such as VM 1 420A, VM 2 420B, and VM 3 420C. The server includes a virtual machine management service (VMMS) 425 and a backup agent 430. In this example, the server is a Hyper-V server, the backup media is an EMC Data Domain system, the backup server is a NetWorker Server, and the backup agent is the EMC NetWorker Module for Microsoft (NMM).

To backup a particular virtual machine, the backup agent issues a VM export request 435 to VMMS identifying the particular virtual machine to be exported. The request may identify a location where the virtual machine should be exported. VMMS exports 440 the virtual machine to the requested location (e.g., backup media 410). An export 445 of a virtual machine may include a virtual hard disk file 450 of the virtual machine and encrypted configuration and state files 455. The export or virtual machine data is saved 460 to the backup media. Backup metadata is saved 465 to the backup server. The export operation, however, may be outside of the VSS backup framework and does not provide for a configuration file (e.g., BCD) that can be accessed by the backup agent.

Figure 5:
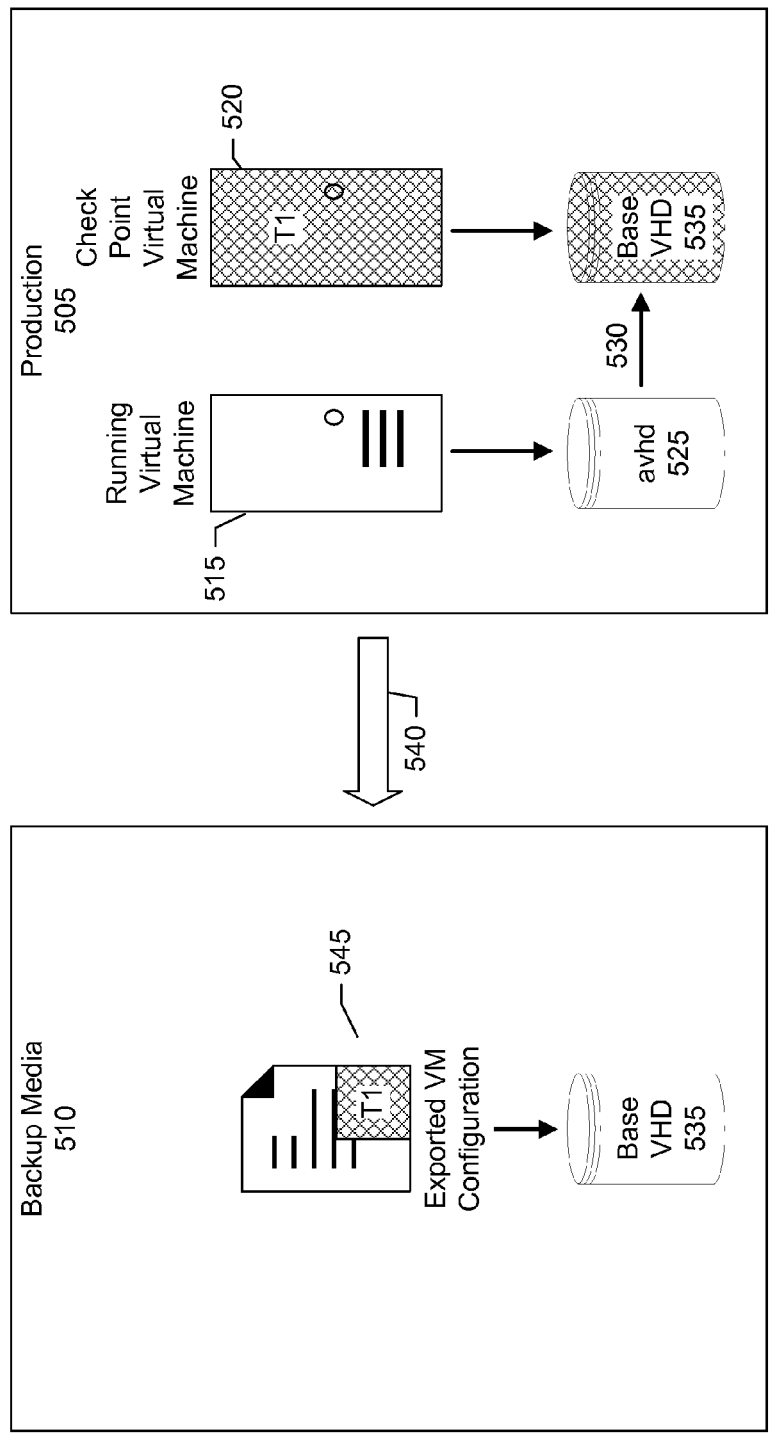
FIG. 5 shows a block diagram of a full backup of a virtual machine according to a specific embodiment.

FIG. 5 is a block diagram showing an example of a full backup. In the example shown in FIG. 5 there is a production environment 505 and a backup media 510. The production environment includes a running virtual machine 515. When the virtual machine is to be backed up a first backup check point (e.g., T1) 520 is created. Once the backup check point is created, all virtual machine operating system files, application data, and data changes made during the execution of the virtual machine are stored in a differencing virtual hard disk 525.

The differencing virtual hard disk is associated with the backup check point and points 530 back to a base (or parent) virtual hard disk 535 for unchanged data. In a specific embodiment, the differencing virtual hard disk is referred to as an automatic virtual hard disk file (AVHD or AVHDX file). The differencing virtual hard disk allows changes to the virtual machine to continue in the production environment while the virtual machine is being backed up to the backup media. In other words, the virtual machine can be live exported 540 as a backup to the backup media. The backup results in base virtual hard disk 535 being stored on the backup media along with virtual machine configuration and state information 545 as of the time (e.g., T1) the backup check point was created.

Data and other changes after T1 are stored in differencing virtual hard disk 525. When the backup agent determines that the virtual machine should be backed up, the system can discover that a backup was made at T1, and in a current or next backup T2, backup the data or changes between T1 and T2 to the backup media. Check point T1 can be removed or merged with new check point T2. Check point T2 can be maintained as the current check point for the next backup. The process can be repeated for a next or subsequent backup.

The first backup check point may be converted into a reference point. The reference point may refer to a resilient change tracking identifier (RCT ID) in order to track changes made after the backup (e.g., after the differencing virtual hard disk was created) and thus identify what blocks (e.g., differencing virtual hard disk 525) should be backed up in a following incremental backup. The RCT ID may be associated with a virtual hard disk and identify a virtual hard disk at a particular point in time.

Referring back to step 320 (FIG. 3), the backup agent creates a backup components document associated with the exported virtual machine. In a specific embodiment, the BCD is created using information gathered from Hyper-V VSS metadata. The BCD may be backed up to the backup media along with the backed up virtual machine. The BCD captures or includes configuration and state information for the virtual machine such as a path of the virtual machine on the host, a GUID of the virtual machine, a state of the virtual machine (e.g., "on" or "off"), a list of files that have been backed up and thus should be restored with the virtual machine, or combinations of these. When the virtual machine is to be restored, the BCD can be read by the backup agent to identify the original location of the virtual machine on the host (e.g., folder path), the state of the virtual machine, and its GUID.

Table A below shows an example of Hyper-V VSS Writer metadata that is used to generate a BCD for backing up an online virtual machine "CSV-VM3." The BCD captures the GUID of the virtual machine in "componentName," state of the virtual machine (e.g., "On" or "Off"), and a list of files backed up and that are to be restored when the virtual machine is recovered.

TABLE A

```
<FILE_GROUP componentFlags="3" selectableForRestore="yes" selectable="yes"
notifyOnBackupComplete="no" restoreMetadata="no" caption="Online\CSV-VM3"
componentName="6E2DC251-ABF1-4DCF-8EC7-DEB9434107D7" logicalPath="">
    <FILE_LIST filespecBackupType="1285" filespec="6E2DC251-ABF1-4DCF-8EC7-
DEB9434107D7.xml" path="C:\ClusterStorage\Volume2\CSV-VM3\Virtual Machines\"/>
    <FILE_LIST filespecBackupType="1285" filespec="CSV-VM3.VHDX"
path="C:\ClusterStorage\Volume2\CSV-VM3\VIRTUAL HARD DISKS\"/>
    <FILE_LIST filespecBackupType="66821" filespec="72E3A507-23F8-405B-8947-
1359D560EEA7.xml"path="C:\ClusterStorage\Volume2\CSV-VM3\Snapshots"/>
    <FILE_LIST filespecBackupType="66821" filespec="CSV-VM3-AutoRecovery.avhdx"
path="C:\ClusterStorage\Volume2\CSV-VM3\VIRTUAL HARD DISKS"/>
</FILE_GROUP>
```

Consider in the example above that the virtual machine "CSV-VM3" is deleted from the customer's (or production) environment. The customer wishes to retrieve or restore the virtual machine to exactly same state and place where it was previously. The backup agent can retrieve the BCD and read the location of the virtual machine's files. The backup agent restores the virtual machine with the same GUID it had previously. The backup agent can then change the state of the virtual machine to "on" or "off" as corresponding to its state when it was last backed up. The BCD may include configuration information such as a host location of the virtual hard disk that the virtual machine connects to, and other configuration details.

Referring back to FIG. 3, a flow for an incremental backup may be as follows. In a step 330, after performing a full or previous backup of the virtual machine, a second backup check point (e.g., T2) is created. In a step 335, a request is issued to VMMS to export changes made to the virtual machine between the first and second backup check points. In a step 340, an incremental backup of the exported changes is performed.

As in the previous backup, the backup agent or backup system creates a BCD and VMMS creates encrypted configuration and state files that are associated with the incremental backup. In some cases, the BCDs from the full and incremental backups will include the same or similar information such as the host path identifying a location of the virtual hard disks. In other cases, the information may be different. For example, a user may have added a virtual hard disk between the previous backup (e.g., full backup) and current backup (e.g., incremental backup). In this case, the BCD for the current backup will specify a path or location on host of the added virtual hard disk. As another example, the user may have moved the virtual hard disk between the backups. In this case, the BCD for the current backup will specify the new path or location on the host for the moved virtual hard disk. The location of the virtual disk may be found by querying the parent location of the virtual disk.

Figure 6:
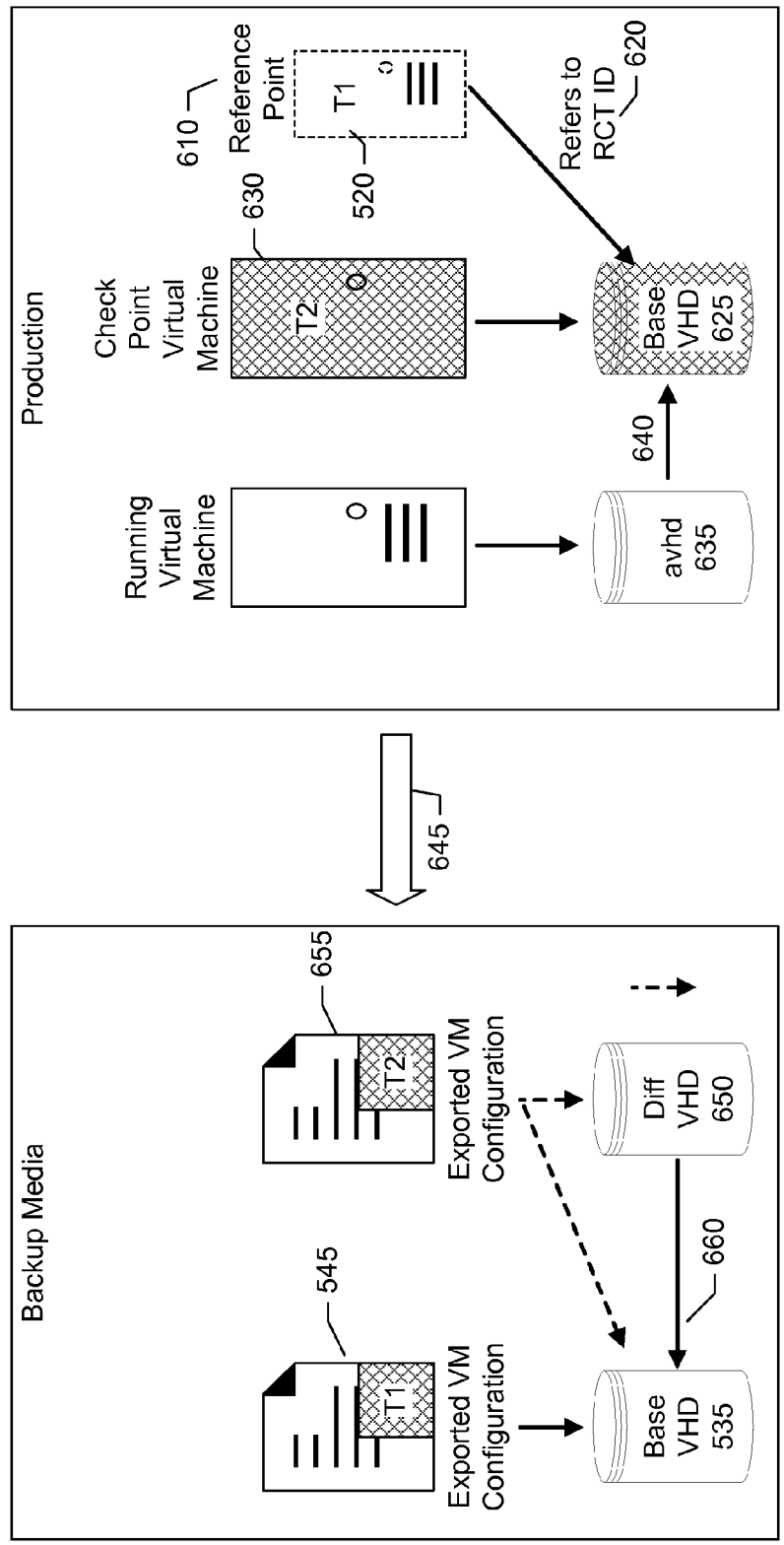
FIG. 6 shows a block diagram of an incremental backup of the virtual machine according to a specific embodiment.

FIG. 6 is a block diagram showing an example of an incremental backup based on the previous backup as shown in FIG. 5. Specifically, after the previous backup of the virtual machine (FIG. 5), a state of production environment 505 includes a reference point 610 corresponding to first backup check point 520 (e.g., T1) and referring 620 to an RCT ID in order to track changes made after the previous backup. Maintaining a reference point corresponding to the previous backup allows changes after the previous backup to be backed up in a following incremental backup. In the example shown in FIG. 6, a base or parent virtual hard disk 625 thus includes changes made after the previous backup of the virtual machine from FIG. 5.

Similar to the previous backup of the virtual machine from FIG. 5, when the virtual machine is to be backed up, another backup check point or a second backup check point (e.g., T2) 630 is created. Once the backup check point (or more specifically the second backup check point) is created, all virtual machine operating system files, application data, and data changes made during the execution of the virtual machine are stored in a differencing virtual hard disk 635.

Differencing virtual hard disk 635 is associated with the second backup check point and points 640 back to base or parent virtual hard disk 625 for unchanged data. As discussed above, differencing virtual hard disk 635 allows changes to the virtual machine to continue in the production environment while the virtual machine is being backed up (e.g., while the incremental backup is being performed) to the backup media. After the virtual machine has been backed up to the backup media, old check point T1 may be merged with new check point T2.

Reference point 610 or the RCT ID from the previous backup is used to determine what has changed in the base or parent virtual hard disk since the previous backup and to thus create a differential export 645 of the virtual machine. The incremental backup (or differential export) of the virtual machine results in a differential virtual hard disk 650 being stored on the backup media along with virtual machine configuration and state information 655 as of the time (e.g., T2) corresponding the (second) backup check point. Differential virtual hard disk 650 thus includes the changes associated with the virtual machine between the previous backup at T1 and the current backup at T2. The incremental backup stored on the backup media is linked 660 to the parent or previous backup.

Similar to the previous backup of the virtual machine from FIG. 5, the second backup check point may be converted to a new reference point that refers to a new RCT ID in order to track changes made after the incremental backup and thus identify what blocks should be backed up in another following incremental backup. The previous reference point or RCT ID may be removed.

Referring back to FIG. 3, in a step 345, the incremental backup of the virtual machine on the backup media is merged with the full backup of the virtual machine on the backup media to create a synthetic full backup of the virtual machine. In other words, the backup system merges differential virtual hard disk 650 (FIG. 6) with base virtual hard disk 535 to create a merged virtual hard disk on the backup media.

An incremental backup can improve backup performance because rather than backing up all the data only changes between the last backup and the current point-in-time may be transmitted across the network to the backup media. However, restoring from incremental backups can be a complex and time-consuming task because it can require restoring the first full backup and applying the chain of incremental backups to arrive at the desired restoration state. Synthesizing a full backup by merging the first full backup with one or more incremental backups helps to increase the restoration performance and scalability especially when there can be hundreds or even thousands of virtual machines as may be the case in a typical data center.

In a specific embodiment, the BCD created by the backup system stores the list of virtual machine files backed up. It may store, for example, the host location of the files at the point of backup. For a particular virtual machine, it may store, for example, the host location for the virtual hard disks and encrypted configuration file. These paths are needed during a restore of a virtual machine in cases where, for example, the virtual machine is deleted from the host or has otherwise been corrupted. During a restore, the backup agent can use or read the information stored in the BCD to determine where on the host that the virtual hard disk and encrypted configuration files should be copied to from the backup storage media.

The virtual hard disk identified in the BCD may be a merged virtual hard disk that results from the merging on the backup media of a parent virtual hard disk and one or more child virtual hard disks or differencing disks. The parent virtual hard disk corresponds to a full backup. The child virtual hard disks correspond to incremental backups. It should be appreciated that copies of parent and child virtual hard disks may be merged so as to preserve the previous backups. The encrypted configuration file may be the encrypted configuration file from the last or a previous backup used with the synthetic full. The encrypted configuration file may identify virtual machine settings such as memory, number of processors, virtual adaptor configurations, and so forth. Once the virtual hard disk and encrypted configuration files have been copied over to the host to the proper locations or folders, the backup agent can initiate through VMMS the import. The encrypted configuration files are supplied to VMMS in order to create a planned virtual machine.

In other words, in specific embodiment, a BCD can reflect the state of files after a merge of a parent virtual hard disk and one or more child virtual hard disks and will specify or state the merged parent virtual hard disk. The BCD is used for restore as it contains necessary information to recreate the virtual machine. Using BCD, the backup system can restore the virtual machine to its original location, even if the virtual machine is deleted. For example, the BCD contains the file system path and location for the virtual machine configuration file and each virtual hark disk file for the virtual machine.

Figure 7A:
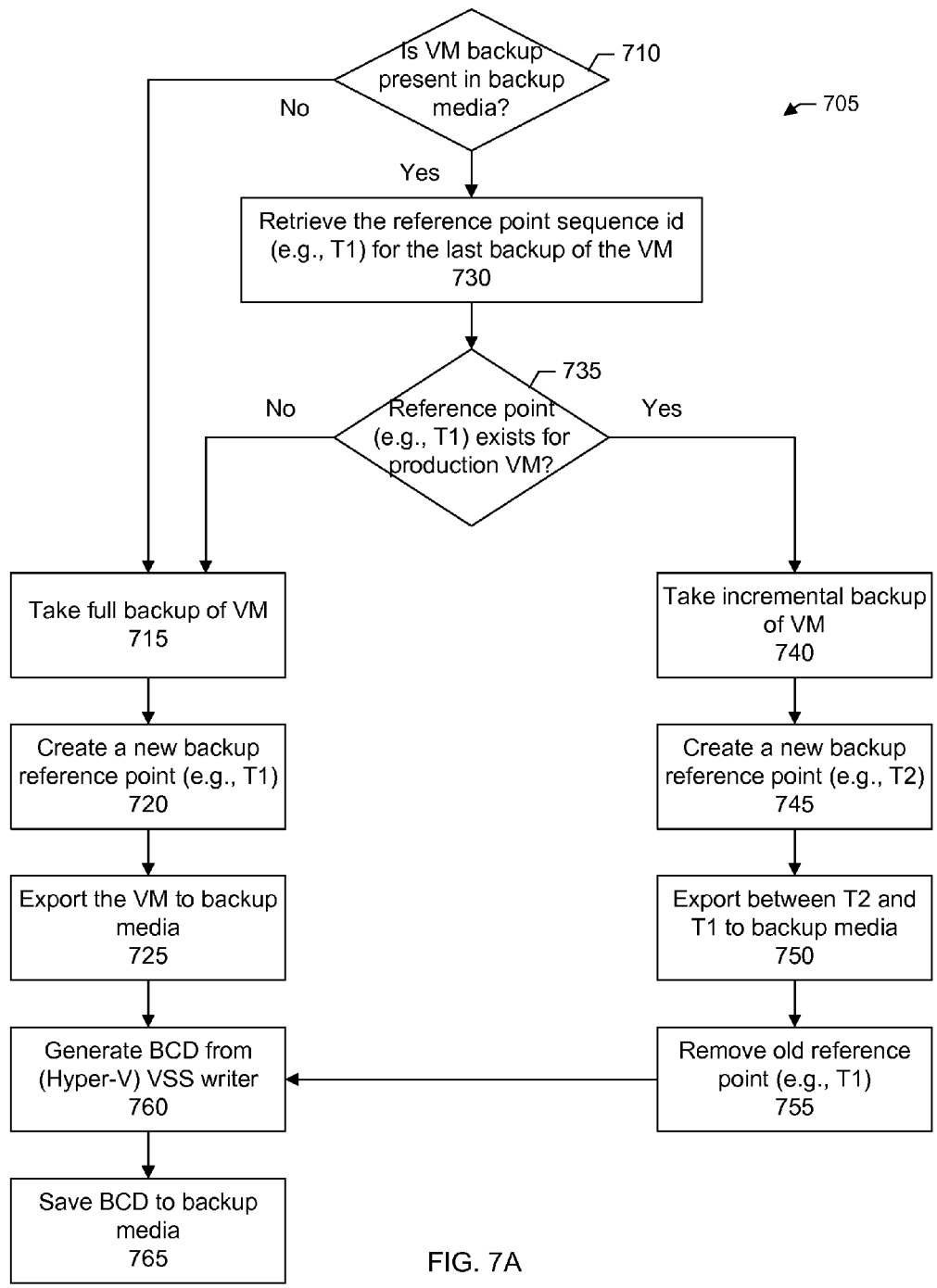
FIG. 7A shows a flow for determining whether a full or incremental backup should be performed according to a specific embodiment.

FIG. 7A shows a flow 705 of the backup agent for determining whether the backup agent should perform a full or incremental backup of a virtual machine. In a step 710, the backup agent determines whether the virtual machine is present in the backup media. For example, the backup agent may obtain the GUID of the virtual machine on the host to be backed up. Using the GUID, the backup agent may consult with the backup server to determine whether a backup index or catalog maintained by the backup server includes an entry indicating that the virtual machine having that specific GUID is present on the backup media.

If the virtual machine is not present in the backup media, in a step 715, the backup agent takes a full backup of the virtual machine. Specifically, a new backup reference point (e.g., T1) is created (step 720) and the virtual machine is exported to the backup media (step 725). See FIG. 3, steps 310-325; FIGS. 4-5; and discussion accompanying the figures.

Alternatively, if the virtual machine is present in the backup media, in a step 730, the backup agent retrieves the reference point sequence identifier for the last backup of the virtual machine. The reference point sequence identifier may be stored in a backup index or catalog maintained by the backup server. In other words, the reference point sequence identifier may be stored as an attribute of the backup index. In the example shown in FIG. 6, the backup agent retrieves reference point sequence identifier T1 from the backup index which corresponds to the last backup of the virtual machine by the backup agent. However, the retrieved reference point sequence identifier may or may not correspond to the current check point in the production environment because other check points may have been created in the production environment independent of the backup agent.

Thus, in a step 735, the backup agent verifies whether the retrieved reference point sequence ID exists for the production virtual machine. For example, in some cases there may be a discrepancy between the latest reference point sequence ID as recorded in production environment and the latest reference point sequence ID as recorded in the backup server. Such discrepancies may exist, for example, if a check point was created independent of the backup agent. Specifically, the production environment may include other backup applications which may result in a check point being created, a user may have decided to create a check point, or both. For example, the user may have created a check point prior to installing a security update on the virtual machine or other application in order to return the virtual machine to the previous state if there is a problem with the security update or application.

Verifying whether the retrieved reference point sequence ID exists for the production virtual machine helps to prevent data loss in cases of an incremental backup. The verification helps to confirm that data not included or present in the incremental backup has already been backed up. Thus, if the reference point ID does not exist for the production virtual machine, a full backup of the virtual machine is performed (step 715).

Alternatively, if the reference point ID does exist for the production virtual machine (thereby indicating that data prior to the creation of the reference point ID has already been backed up), an incremental backup is performed (step 740). Specifically, a new (or second) backup reference point (e.g., T2) is created (step 745), a request is issued to export changes between the second and first backup reference points to the backup media (step 750), and the old or prior backup reference point (e.g., T1) is removed (step 755). See FIG. 3, steps 330-340; FIGS. 4-6; and discussion accompanying the figures.

In a step 760, the backup agent generates a BCD from the VSS writer (e.g., Hyper-V VSS writer). In a step 765, the backup agent saves the BCD to the backup media.

The backup checks and verifications help to facilitate the backup process by ensuring good performance and reliability. For example, an incremental backup is desirable because it can be completed in less time than a full backup. However, if a full backup does not exist on the backup media, an incremental backup will not be performed because it may be problematic or there may be a loss of data when restoring from merely an incremental backup. Thus, a feature of the system checks whether or not the virtual machine is present on the backup media. If the virtual machine is not present on the backup media a full backup is performed.

If the virtual machine is present on the backup media an incremental backup may be performed. There can, however, be other check points in the production environment that may or may not correspond to a backup by the backup agent. Thus, before performing an incremental backup it is desirable to ensure that the incremental backup will be following a continuous sequence or chain of backups so that there are no gaps or loss of data. Verifying the sequence identifier in the backup media with the sequence identifier in the production environment helps to ensure that data not part of the current incremental backup that is about to be performed has in fact already been backed up to the backup media.

Consider, as an example, the scenario shown FIG. 6. Before performing an incremental backup, the backup agent or system may obtain from the backup media a first check point (e.g., T1). The backup agent may then determine whether the production environment includes a corresponding check point. As shown in the example of FIG. 6, a corresponding check point (e.g., T1) exists in the production environment. Thus, a second check point T2 can be created in the production environment to perform an incremental backup of data between T2 and T1. Alternatively, if the backup agent determines that the corresponding check point (e.g., T1) does not exist in the production environment or is unable to find the corresponding check point, the backup agent performs a full backup.

In a specific embodiment, a feature of the system includes managing the check points that may be created in the production environment. For example, as discussed above, an environment may include multiple check points resulting from other backup applications or user actions. Basing an incremental backup on a check point resulting from another backup application or a user action may lead to a loss of data.

FIG. 7B shows an example of an index or catalog 770 that can be used by the backup system to help manage the check points. A first column (VM GUID) of the table stores an identifier associated with a virtual machine. A second column (Last Backup) stores the time and date that the virtual machine was last backed up. A third column (Backup Type) stores the type of backup that was performed (e.g., full backup or incremental backup). A fourth column (Reference Point Sequence ID) stores a reference point that can correspond to a check point in the production environment. Tracking the reference points helps to ensure that an incremental backup can be performed without having any data loss despite the possibility that the production environment may include other check points and branches. A fifth column (Backup Location) stores a location or path where the backup is stored.

Figure 8:
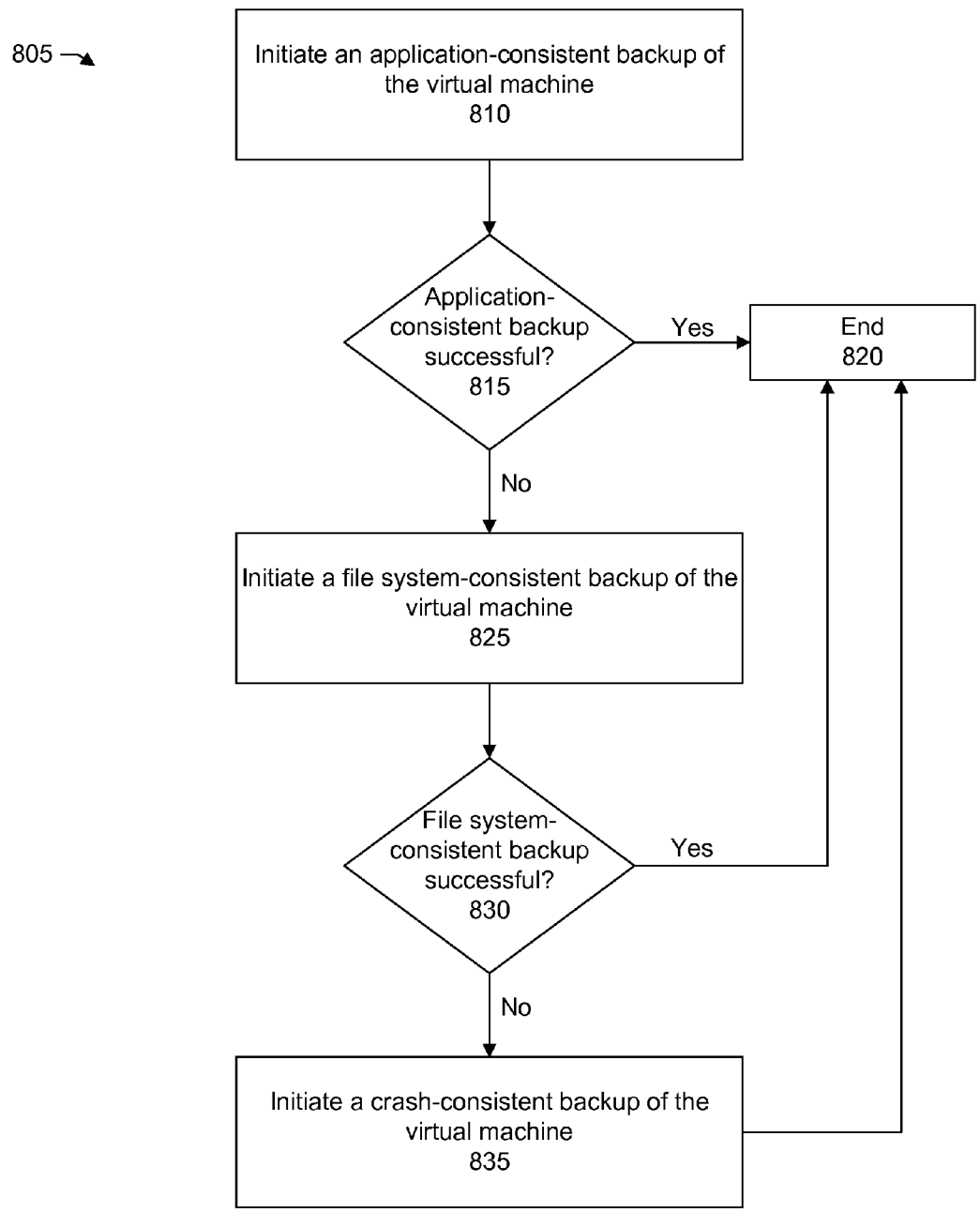
FIG. 8 shows a flow for falling back to a lower level of backup consistency when a higher level of backup consistency is not available according to a specific embodiment.

FIG. 8 shows a flow 805 for falling back on a lower level of backup consistency when a higher level of consistency fails. In a step 810, the backup agent initiates an application-consistent backup of the virtual machine. In a specific embodiment, an application-consistent backup is facilitated through the volume shadow copy service (VSS). VSS notifies the VSS writer associated with each application on the virtual machine that a backup of the virtual machine has been triggered. An application may then flush its memory-resident data to disk and pending I/O operations so that there is nothing in memory and no pending I/O to be lost.

For example, applications such as database applications (e.g., Microsoft SQL Server or Microsoft Exchange) may write application memory to log files before the contents are committed to the database. When the application data is backed up, it is desirable that the contents of the memory and any pending writes are completed and captured in the backup. If the contents of memory are not allowed to flush to disk there may be a loss of data.

In a step 815, the backup agent determines whether the application-consistent backup was or was not successful. For example, the backup agent may receive a notification from VMMS or VSS indicating a success or failure. If the application-consistent backup is successful, the processes ends (step 820).

An application-consistent backup, however, may not always be successful. For example, the VSS writer inside the virtual machine may not be stable, there may be a lack of space inside the virtual hard disk of the virtual machine, the application installed in the virtual machine may not have provided a VSS writer or may not have properly registered with VSS, and so forth.

If the application-consistent backup was not successful, in a step 825, the backup agent initiates a file-system consistent backup of the virtual machine. In a file-system consistent backup, all files in the virtual machine may have a consistent or stable state, but there may be a loss of pending application transactions.

In a step 830, the backup agent determines whether the file system-consistent backup was or was not successful. For example, the backup agent may receive a notification from VMMS or VSS indicating a success or failure. If the file system-consistent backup is successful, the processes ends (step 820).

If, however, the file system-consistent backup was not successful, the backup agent initiates a crash-consistent backup of the virtual machine (step 835). In a crash-consistent backup, open files may not be brought to a consistent state and there may be a loss of pending application transactions.

Table B below shows a flow of a backup workflow to decide the level of backup according to a specific embodiment.

TABLE B

| Step | Description |
|---|---|
| 1 | If the VM backup is not present in the backup media take a full backup. |
| 2 | Get the reference point of the latest backup of the VM from backup media. |
| 3 | If the reference point does not exist for the VM take a full backup. |
| 4 | Otherwise take an incremental backup with respect to the last backup reference point. |

Table C below shows a flow of a full backup workflow according to a specific embodiment.

TABLE C

| Step | Description |
|---|---|
| 1 | Backup check point "T1" is created. It saves VM's configuration and VHD file and start writing to a AVHD which is child to the VHD. |
| 2 | Export the VM to backup media. |
| 3 | Convert the check-point "T1" in to a reference point. |

Table D below shows a flow of an incremental backup workflow according to a specific embodiment.

TABLE D

| Step | Description |
|---|---|
| 1 | Create a backup check point "T2." |
| 2 | Export between "T2"and "T1"in the backup media, thereby resulting in a differencing virtual hard disk (e.g., VHDx or AVHDx) file that includes the incremental data. |
| 3 | Merge the differencing virtual hard disk (VHDx) with the virtual hard disk (VHDx) from last backup. This results in a virtual hard disk (VHDx) that includes the synthetic-full image of the virtual machine. |
| 4 | Convert the check-point "T1" into a reference point. |
| 5 | Remove the old reference point "T1." |

Referring back to FIG. 3, in a step 350, the backup agent, when requested, can restore the virtual machine to the host from a synthetic full backup of the virtual machine. The restoration process may include reading the BCD associated with the backed up virtual machine so that the backup agent can configure the restored virtual machine on the host according to the configuration and state information stored in the associated BCD.

Figure 9:
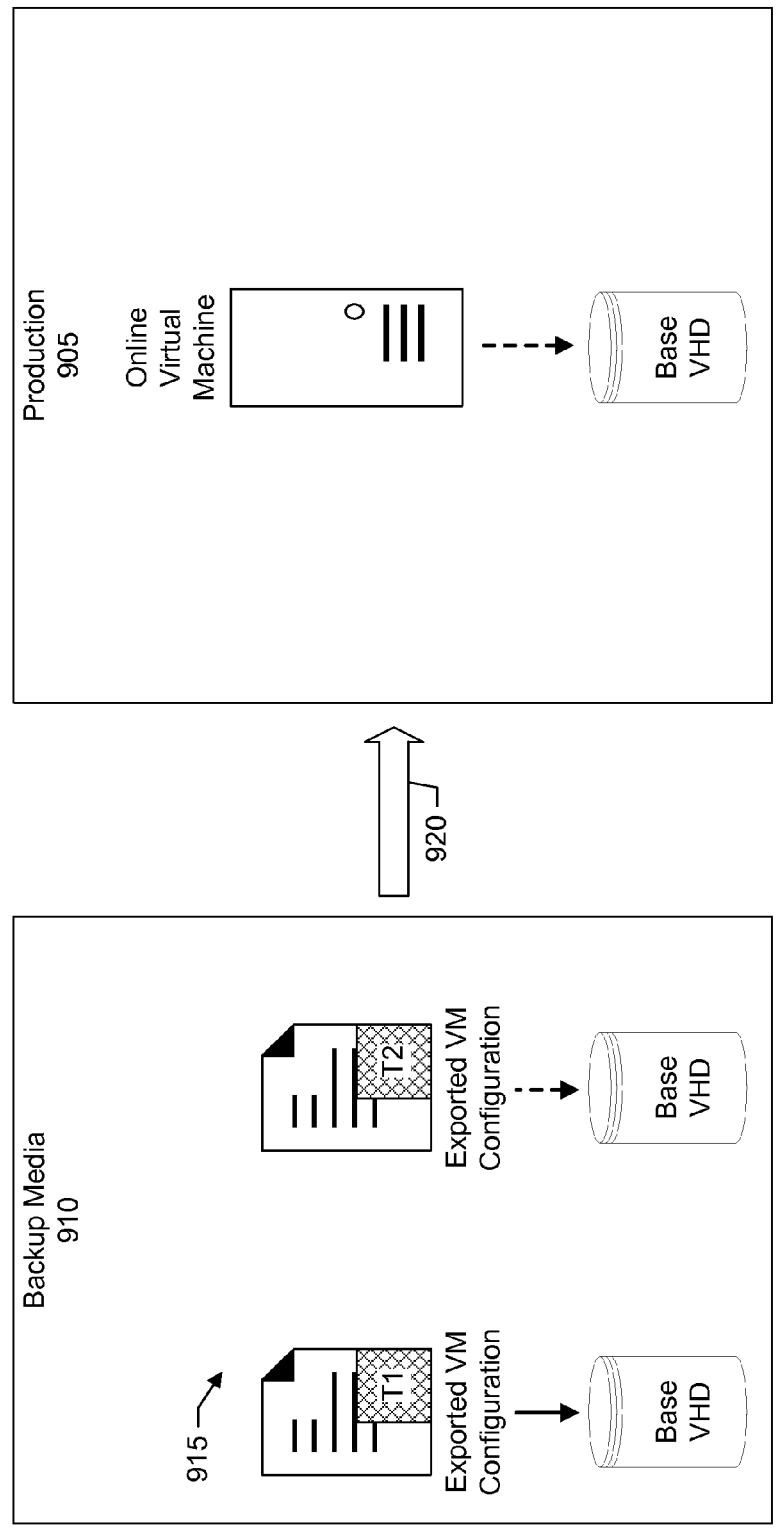
FIG. 9 shows a block diagram for restoring a virtual machine according to a specific embodiment.

FIG. 9 is a block diagram showing an example of a restoration. In the example shown in FIG. 9 there is a production environment 905 and a backup media 910. The backup media may store any number of virtual machine backups 915, each backup including a virtual hard disk (e.g., base VHD file) and configuration information associated with the backed up virtual machine. To restore a particular virtual machine, the backup agent copies 920 the virtual hard disk and encrypted configuration files to the production host. A planned virtual machine is created on the host and configured.

Figure 10:
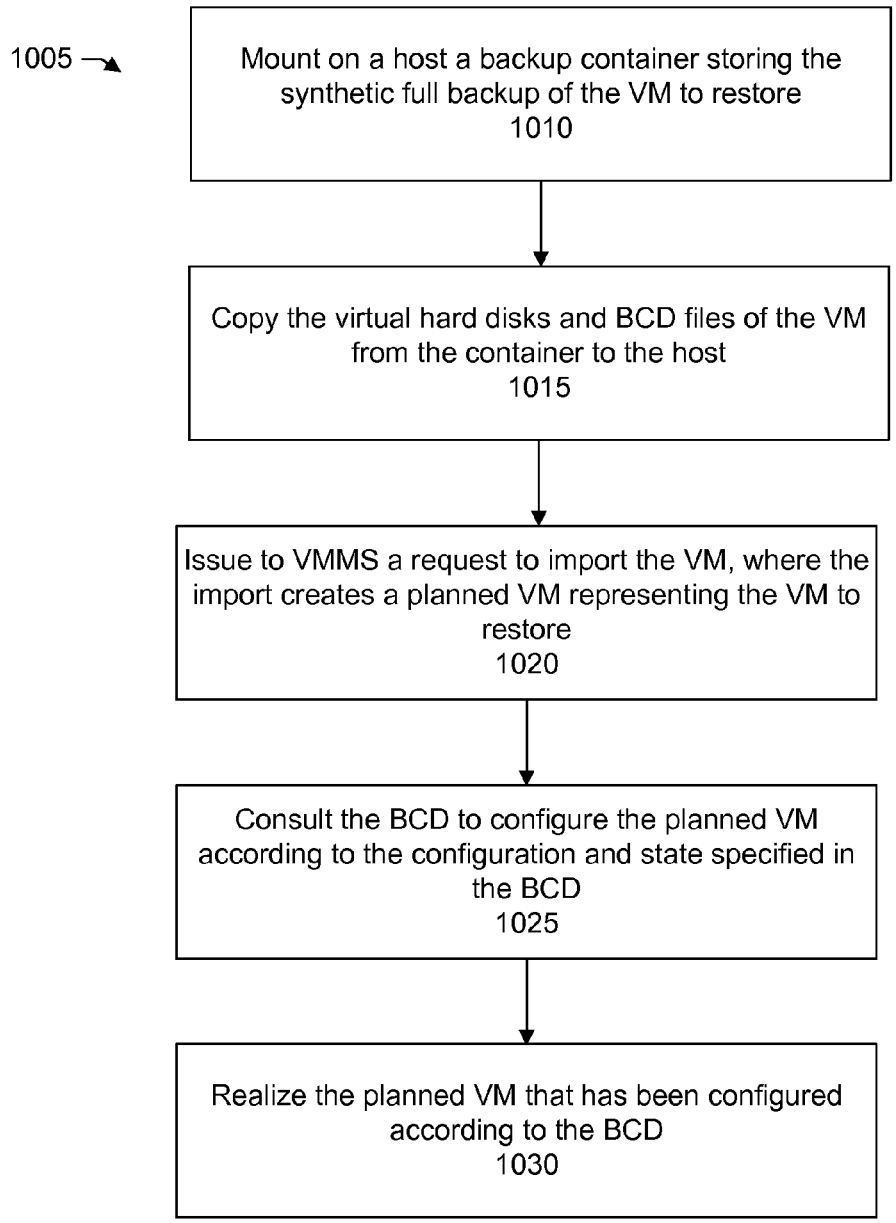
FIG. 10 shows a flow for restoring a virtual machine from a synthetic full backup of the virtual machine according to a specific embodiment.

More particularly, FIG. 10 shows an overall flow 1005 for restoring a virtual machine to a host from a synthetic full backup of the virtual machine. In brief, in a step 1010, the backup agent mounts on the host a backup container (e.g., folder on the backup media) storing the synthetic full backup of the virtual machine to restore. The mount allows the user (e.g., backup administrator) to browse and select the virtual machine to restore.

In a step 1015, the backup agent copies to the host the files of the selected virtual machine to restore. These files may include the merged virtual hard disk of the synthetic full backup of the virtual machine, a BCD file having information describing a last configuration and state of the virtual machine, the VMMS encrypted configuration and state files, or combinations of these. The BCD specifies the host location that the merged virtual hard disk and VMMS encrypted configuration files should be copied to. In a step 1020, the backup agent issues to VMMS a request to import the virtual machine based on the virtual machine files copied from the backup media to the host. The importation of the virtual machine results in a planned virtual machine representing the virtual machine to be restored on the host. For example, the request to import may include an option to create a planned virtual machine. In a step 1025, the backup agent consults the BCD to configure the planned virtual machine according to the configuration and state specified in the BCD. In a step 1030, the configured planned virtual machine is realized.

Figure 11:
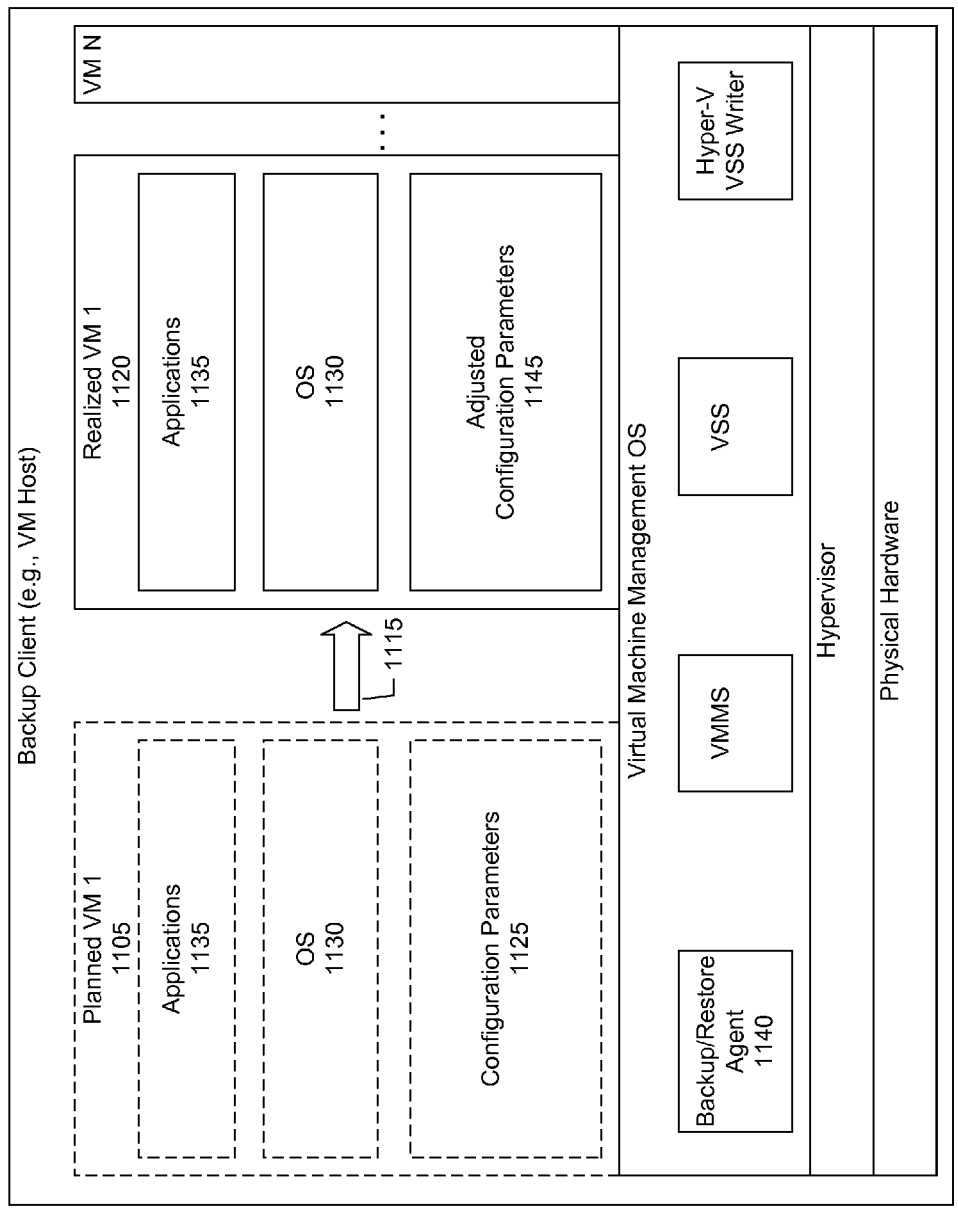
FIG. 11 shows a block diagram of configuring a planned virtual machine.

FIG. 11 is a block diagram showing an example of a planned virtual machine VM 1 1105 having been created on the host as a result of the import process. The planned virtual machine allows changes to be made to configuration parameters 1125 associated with the virtual machine before the virtual machine is realized or converted 1115 to a real virtual machine 1120.

The planned virtual machine may include a set of configuration parameters 1125 (or a structure or data structure storing configuration values), a guest operating system 1130, and guest applications 1135 that have been restored to the host from the synthetic full backup on the backup media. The host virtualization platform, however, will not execute applications or an operating system in the planned virtual machine or allocate computing cycles to the planned virtual machine until the planned virtual machine is converted into realized virtual machine 1120 (e.g., virtual machine registers with the virtualization platform as a realized virtual machine).

Backup/restore agent 1140, however, can interact with the planned virtual machine by directing the adjustment of one or more configuration parameters 1125. For example, values for the configuration parameters may have been set to default or other values by the virtualization platform. These values, however, may be different from what is specified in the BCD. However, once the planned virtual machine is realized, the realized virtual machine will include a set of configuration parameters 1145 (corresponding to configuration parameters 1125) in which one or more parameters have been adjusted according to the configuration and state information stored in the BCD. In a specific embodiment, configuration operations for the planned virtual machine includes removing planned snapshots, modifying the disk path, and validating the planned virtual machine. Removing planned snapshots is required as the restore will be from a synthesized full backup. For example, the disk path of the planned virtual machine may be modified or updated so that it points to the location on the host where the virtual hard disk has been copied to from the backup media.

Other examples of configuration operations include allocating resources and adjusting network settings. A configuration parameter may be associated with disk, memory, network device, processor, or other hardware or virtual hardware component available for use by the virtual machine (e.g., virtual network device, virtual memory, virtual storage device, or virtual hard disk).

In a specific embodiment, the backup agent adjusts a configuration parameter of the planned virtual machine to a value as specified in the BCD. For example, a configuration parameter of the planned virtual machine may be set at a first value. A corresponding configuration parameter in the BCD may be specify a second value, different from the first value. The backup agent may change, set, alter, edit, modify, or adjust the configuration parameter of the planned virtual machine from the first value to the second value.

The configuration parameter may be a path of the virtual hard disk associated with the virtual machine. For example, a configuration parameter of the planned virtual machine may specify a path to the virtual hard disk that is different from a path as specified in the BCD. Changing the disk path to the path as specified in the BCD allows the virtual machine to find, access, retrieve, change, and store data to the virtual hard disk restored from the synthetic full backup. As another example, the configuration parameter may be a state of the virtual machine. For example, the planned virtual machine may specify a first state for the virtual machine. The BCD may specify a second state, different from the first state. Changing the state of the virtual machine to the state as specified in the BCD allows the virtual machine to be restored to its state as of the last or most recent backup. Planned virtual machines are further discussed in U.S. patent application Ser. No. 13/177,209, filed Jul. 6, 2011, which is incorporated by reference along with all other references cited herein.

Table E below shows a flow for restoring a virtual machine according to a specific embodiment. In this specific embodiment, the virtualization platform includes Hyper-V.

TABLE E

| Step | Description |
|---|---|
| 1 | Backup agent (e.g., NMM) mounts the backup container on the host (e.g., Hyper-V Server.) |
| 2 | Backup agent copies VHDs and VMMS encrypted configuration files to local VM storage location. |
| 3 | Initiate the import (ImportSystemDefinition method) which results in a planned virtual system, that contains same virtual machine GUID as the backed up virtual machine |
| 4 | Remove the planned snapshots |
| 5 | Modify the disk path |

TABLE E-continued

| Step | Description |
|---|---|
| 6 | Modify the configuration, snapshot, swapfile path |
| 7 | Validate the planned system (optional but recommended) |
| 8 | Realize the planned system |

In this specific embodiment, operations for an import-based restore of a virtual machine are implemented using Windows PowerShell Scripts or calls as shown in the example below.
$Msvm_VirtualSystemManagementService=Get-WmiObject-Namespace root\virtualization\v2'-Class Msvm_VirtualSystemManagementService
$Msvm_VirtualSystemSnapshotService=Get-WmiObject-Namespace root\virtualization\v2'-Class Msvm_VirtualSystemSnapshotService Below is an example of a script for step 3 (initiate import):
$ImportSystemDefinition_ret=$Msvm_VirtualSystemManagementService.ImportSystemDefinition
<Configuration File Path of the restored VM>,
<Snapshot File Path of the restored VM>,
$false)
$Msvm_ComputerSystem=[WMi]$ImportSystemDefinition_ret.ImportedSystem The third parameter to ImportSystemDefinition is 'GenerateNewSystemIdentifief' and passing $false to that will retain the existing identifier.

Below is an example of a script for step 4 (remove planned snapshots):
$allSnapshotAssociations=$Msvm_ComputerSystem.GetRelationships("Msvm_SnapshotOfVirtualSystem")
   $enum=$allSnapshotAssociations.GetEnumerator( )
   $enum.Reset( )
   while($enum.MoveNext( ))
   {
   $Msvm_VirtualSystemSnapshotService.DestroySnapshot($enum.Current.Dependent)
   }

Below is an example of a script for step 5 (modify the disk path):
$Msvm_VirtualSystemSettingData=($Msvm_ComputerSystem.GetRelated("Msvm_VirtualSystemSettingData",'
"Msvm_SettingsDefineState",'
$null,'
$null,'
"SettingData",'
"ManagedElement",'
$false, $null)|% {$_})
for each ($Msvm_StorageAllocationSettingData in $Msvm_VirtualSystemSettingData.GetRelated("Msvm_StorageAllocationSettingData"))
   {
   $Msvm_StorageAllocationSettingData.HostResource=@
      ("<Hard Disk path of the restored VM>")
$Msvm_VirtualSystemManagementService.ModifyResourceSettings($Msvm_StorageAllocation SettingData.GetText(2))
   }

Below is an example of a script for step 6 (modify the configuration, snapshot, and swapfile path):
$Msvm_VirtualSystemSettingData.ConfigurationDataRoot="<New Configuration Data Directory of the restored VM>"
$Msvm_VirtualSystemSettingData.SnapshotDataRoot= "<New Snapshot Directory of the restored VM>"

$Msvm_VirtualSystemSettingData.SwapFileDataRoot= "<New Swap File Directory of the restored VM>"
$Msvm_VirtualSystemManagementService.ModifySystemSettings($Msvm_VirtualSystemSettingData.GetText(2))

Below is an example of a script for step 7 (validate the planned system):
$Msvm_VirtualSystemManagementService.ValidatePlannedSystem($Msvm_ComputerSystem)

Below is an example of a script for step 8 (realize the planned system):
$Msvm_VirtualSystemManagementService.RealizePlannedSystem($Msvm_ComputerSystem)

Consider, as another example, a virtual machine (e.g., VM1) having the following file structure:
VM1 location: "C:\myVM\VM1"
VM1 VHD location: "C:\myVM\VM1\Virtual Hard Disk\VM1.vhdx"
"C:\myVM\VM1\Virtual Hard Disk\VM1_GUID1.vhdx"
VM1 Configuration: "C:\myVM\VM1\VM1_Config.xml" (actually an encrypted XML)

A full backup would include the following files backed up:
"C:\myVM\VM1\Virtual Hard Disk\VM1.vhdx" and
"C:\myVM\VM1\Virtual Hard Disk\VM1_GUID1.vhdx"

The associated BCD would contain or specify the following:
Location of VHD as: "C:\myVM\VM1\Virtual Hard Disk\VM1.vhdx" (The location of VHDX)
Location of Configuration: C:\myVM\VM1\VM1_Config.xml Consider, as a further example, that VM1 is moved before the incremental backup to a location "C:\myVM_NewLoc\VM1."

An incremental backup would include the following files backed up:
"C:\myVM_NewLoc\VM1\Virtual Hard Disk\VM1.vhdx" and
"C:\myVM_NewLoc\VM1\Virtual Hard Disk\VM1_GUID1.vhdx"

The associated BCD would contain or specify the following:
Location of VHD as: "C:\myVM_NewLoc\VM1\Virtual Hard Disk\VM1.vhdx"
Location of Configuration: "C:\myVM_NewLoc\VM1\VM1_Config.xml"

The location of the VHD is found by querying the parent location of VM1_GUID1.vhdx. For example, the backup system can traverse as a tree or as a list from a child (or differencing or incremental) virtual disk to obtain the root parent from the host machine. A differencing disk can store information (e.g., location or path information) about the root parent virtual disk and this information can be retrieved by the backup system. The examples above illustrate generation of the BCD by the backup agent on the host and the information saved. The BCD is not changed in the synthetic process.

In a specific embodiment, the backup agent may conduct backups of two or more virtual machines in parallel or concurrently. For example, the backup agent may initiate a first export of a first virtual machine for a first backup. After initiating the first export and while the first backup is in progress, the backup agent may initiate a second export of a second virtual machine, different from the first virtual machine, for a second backup. A failure of the first or second backup will not affect the operation of another of the first or second backup. For example, the first backup may be stopped, but the second backup may continue.

In a specific embodiment, a method includes issuing, by a backup agent, to a virtual machine management service (VMMS) a request for a virtual machine on a host to be exported, wherein the VMMS generates a configuration file associated with the exported virtual machine that cannot be accessed by the backup agent because the configuration file is encrypted by the VMMS; performing a full backup of the exported virtual machine; creating a first backup check point corresponding to the full backup; after the performing a full backup, creating a second backup check point; issuing, by the backup agent, to the VMMS a request to export changes made to the virtual machine between the first backup check point and the second backup check point; performing an incremental backup of the exported changes; creating a backup components document comprising information identifying a location of the virtual machine on the host, a state of the virtual machine, and globally unique identifier (GUID) of the virtual machine, where a synthetic full backup of the virtual machine is created based on the incremental and full backups, and restoring the virtual machine from the synthetic full backup is based on the information in the backup components document.

Issuing to the VMMS a request for a virtual machine to be exported may include requesting an application-consistent backup of the virtual machine; receiving an indication that the application-consistent backup has failed; and based on the failure of the application-consistent backup, requesting a file system-consistent backup of the virtual machine.

The method may include after the requesting a file system-consistent backup of the virtual machine, receiving an indication that the file system-consistent backup has failed; and based on the failure of the file system-consistent backup, requesting a crash-consistent backup of the virtual machine.

Restoring the virtual machine may include issuing to the VMMS a request for the synthetic full backup of the virtual machine to be imported to the host, wherein the importation results in a planned virtual machine on the host that represents the virtual machine; configuring the planned virtual machine; validating the planned virtual machine; and realizing the planned virtual machine.

Configuring the planned virtual machine may include deleting planned snapshots associated with the planned virtual machine, modifying a disk path of the planned virtual machine, or both.

In another specific embodiment, there is a system for backing up and restoring a virtual machine, the system including a processor-based system executed on a computer system and configured to: issue, by a backup agent, to a virtual machine management service (VMMS) a request for a virtual machine on a host to be exported, wherein the VMMS generates a configuration file associated with the exported virtual machine that cannot be accessed by the backup agent because the configuration file is encrypted by the VMMS; perform a full backup of the exported virtual machine; create a first backup check point corresponding to the full backup; after the performing a full backup, create a second backup check point; issue, by the backup agent, to the VMMS a request to export changes made to the virtual machine between the first backup check point and the second backup check point; perform an incremental backup of the exported changes; create a backup components document comprising information identifying a location of the virtual machine on the host, a state of the virtual machine, and globally unique identifier (GUID) of the virtual machine, where a synthetic full backup of the virtual machine is created based on the incremental and full backups, and restoring the virtual machine from the synthetic full backup is based on the information in the backup components document.

In another specific embodiment, there is a computer program product, comprising a non-transitory computer-readable medium having a computer-readable program code embodied therein, the computer-readable program code adapted to be executed by one or more processors to implement a method comprising: issuing, by a backup agent, to a virtual machine management service (VMMS) a request for a virtual machine on a host to be exported, wherein the VMMS generates a configuration file associated with the exported virtual machine that cannot be accessed by the backup agent because the configuration file is encrypted by the VMMS; performing a full backup of the exported virtual machine; creating a first backup check point corresponding to the full backup; after the performing a full backup, creating a second backup check point; issuing, by the backup agent, to the VMMS a request to export changes made to the virtual machine between the first backup check point and the second backup check point; performing an incremental backup of the exported changes; creating a backup components document comprising information identifying a location of the virtual machine on the host, a state of the virtual machine, and globally unique identifier (GUID) of the virtual machine, where a synthetic full backup of the virtual machine is created based on the incremental and full backups, and restoring the virtual machine from the synthetic full backup is based on the information in the backup components document.

Although embodiments have been described with respect to network backup comprising certain specific technologies, such as Hyper-V servers, NMM backup agents, and VSS, it should be noted that embodiments are not so limited, and that other backup systems and methods may also utilize the backup and recovery methods described herein.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
issuing, by a backup agent, to a virtual machine management service (VMMS) a request for a virtual machine on a host to be exported, wherein the VMMS generates a configuration file associated with the exported virtual machine that cannot be accessed by the backup agent because the configuration file is encrypted by the VMMS;
performing a full backup of the exported virtual machine;
creating a first backup check point corresponding to the full backup;
after the performing a full backup, creating a second backup check point;
issuing, by the backup agent, to the VMMS a request to export changes made to the virtual machine between the first backup check point and the second backup check point;
performing an incremental backup of the exported changes; and
creating a backup components document comprising information identifying a location of the virtual machine on the host, a state of the virtual machine, and globally unique identifier (GUID) of the virtual machine, wherein a synthetic full backup of the virtual machine is created based on the incremental and full backups, and restoring the virtual machine from the synthetic full backup is based on the information in the backup components document, and wherein the issuing to the VMMS a request for a virtual machine to be exported comprises:
requesting an application-consistent backup of the virtual machine;
receiving an indication that the application-consistent backup has failed; and
based on the failure of the application-consistent backup, requesting a file system-consistent backup of the virtual machine.

2. The method of claim 1 comprising:
after the requesting a file system-consistent backup of the virtual machine, receiving an indication that the file system-consistent backup has failed; and
based on the failure of the file system-consistent backup, requesting a crash-consistent backup of the virtual machine.

3. The method of claim 1 comprising:
issuing to the VMMS a request to import the virtual machine from the synthetic full backup, wherein the importation results in a planned virtual machine on the host that represents the virtual machine;
configuring the planned virtual machine;
validating the planned virtual machine; and
realizing the planned virtual machine.

4. The method of claim 3 wherein the configuring the planned virtual machine comprises deleting planned snapshots associated with the planned virtual machine.

5. The method of claim 3 wherein the configuring the planned virtual machine comprises modifying a disk path of the planned virtual machine.

6. A system for backing up and restoring a virtual machine, the system comprising:
a processor-based system executed on a computer system and configured to:
issue, by a backup agent, to a virtual machine management service (VMMS) a request for a virtual machine on a host to be exported, wherein the VMMS generates a configuration file associated with the exported virtual machine that cannot be accessed by the backup agent because the configuration file is encrypted by the VMMS;
perform a full backup of the exported virtual machine;
create a first backup check point corresponding to the full backup;
after the performing a full backup, create a second backup check point;
issue, by the backup agent, to the VMMS a request to export changes made to the virtual machine between the first backup check point and the second backup check point;
perform an incremental backup of the exported changes;

create a backup components document comprising information identifying a location of the virtual machine on the host, a state of the virtual machine, and globally unique identifier (GUID) of the virtual machine, wherein a synthetic full backup of the virtual machine is created based on the incremental and full backups, and restoring the virtual machine from the synthetic full backup is based on the information in the backup components document;

request an application-consistent backup of the virtual machine;

receive an indication that the application-consistent backup has failed; and based on the failure of the application-consistent backup, request a file system-consistent backup of the virtual machine.

7. The system of claim 6 wherein the processor-based system is configured to:

after the request for a file system-consistent backup of the virtual machine, receive an indication that the file system-consistent backup has failed; and based on the failure of the file system-consistent backup, request a crash-consistent backup of the virtual machine.

8. The system of claim 6 wherein the processor-based system is configured to:

issue to the VMMS a request to import the virtual machine from the synthetic full backup, wherein the importation results in a planned virtual machine on the host that represents the virtual machine;

configure the planned virtual machine;

validate the planned virtual machine; and realize the planned virtual machine.

9. The system of claim 8 wherein the processor-based system is configured to:

delete planned snapshots associated with the planned virtual machine.

10. The system of claim 8 wherein the processor-based system is configured to:

modify a disk path of the planned virtual machine.

11. A computer program product, comprising a non-transitory computer-readable medium having a computer-readable program code embodied therein, the computer-readable program code adapted to be executed by one or more processors to implement a method comprising:

issuing, by a backup agent, to a virtual machine management service (VMMS) a request for a virtual machine on a host to be exported, wherein the VMMS generates a configuration file associated with the exported virtual machine that cannot be accessed by the backup agent because the configuration file is encrypted by the VMMS;

performing a full backup of the exported virtual machine;

creating a first backup check point corresponding to the full backup;

after the performing a full backup, creating a second backup check point;

issuing, by the backup agent, to the VMMS a request to export changes made to the virtual machine between the first backup check point and the second backup check point;

performing an incremental backup of the exported changes; and creating a backup components document comprising information identifying a location of the virtual machine on the host, a state of the virtual machine, and globally unique identifier (GUID) of the virtual machine, wherein a synthetic full backup of the virtual machine is created based on the incremental and full backups, and restoring the virtual machine from the synthetic full backup is based on the information in the backup components document, and wherein the issuing to the VMMS a request for a virtual machine to be exported comprises:

requesting an application-consistent backup of the virtual machine;

receiving an indication that the application-consistent backup has failed; and based on the failure of the application-consistent backup, requesting a file system-consistent backup of the virtual machine.

12. The computer program product of claim 11 wherein the method comprises:

after the requesting a file system-consistent backup of the virtual machine, receiving an indication that the file system-consistent backup has failed; and based on the failure of the file system-consistent backup, requesting a crash-consistent backup of the virtual machine.

13. The computer program product of claim 11 comprising:

issuing to the VMMS a request to import the virtual machine from the synthetic full backup, wherein the importation results in a planned virtual machine on the host that represents the virtual machine;

configuring the planned virtual machine;

validating the planned virtual machine; and realizing the planned virtual machine.

14. The computer program product of claim 13 wherein the configuring the planned virtual machine comprises deleting planned snapshots associated with the planned virtual machine.

15. The computer program product of claim 13 wherein the configuring the planned virtual machine comprises modifying a disk path of the planned virtual machine.

* * * * *